US012689277B2

(12) United States Patent (10) Patent No.: US 12,689,277 B2

Vance (45) Date of Patent: Jul. 21, 2026

(54) TRANSDUCER MOUNT SYSTEM

(71) Applicant: Innovative Fishing Concepts, LLC,
Cheyenne, WY (US)

(72) Inventor: Terry Vance, Tucson, AZ (US)

( * ) Notice: Subject to any disclaimer, the term of this patent is extended or adjusted under 35 U.S.C. 154(b) by 271 days.

(21) Appl. No.: 18/655,078

(22) Filed: May 3, 2024

(65) Prior Publication Data

US 2024/0405652 A1 Dec. 5, 2024

Related U.S. Application Data

(60) Provisional application No. 63/470,728, filed on Jun. 2, 2023.

(51) Int. Cl.
| | |
|---|---|
| *H02K 37/24* | (2006.01) |
| *B63B 17/00* | (2006.01) |
| *B63B 49/00* | (2006.01) |
| *B63H 20/00* | (2006.01) |
| *G01S 7/521* | (2006.01) |
| *H02K 7/116* | (2006.01) |
| *G01S 15/96* | (2006.01) |

(52) U.S. Cl.
CPC ............. *H02K 37/24* (2013.01); *B63B 17/00* (2013.01); *B63B 49/00* (2013.01); *B63H 20/007* (2013.01); *G01S 7/521* (2013.01); *H02K 7/116* (2013.01); *G01S 15/96* (2013.01)

(58) Field of Classification Search
CPC ..... B60K 31/0008; F16H 59/24; F16H 59/44; F16H 61/0213; F16H 61/66259; B63B 17/00; B63B 49/00; H02K 37/24; H02K 7/116; B63H 20/007
See application file for complete search history.

(56) References Cited

U.S. PATENT DOCUMENTS

2021/0056944 A1* 2/2021 Vance .................. G10K 11/004
2023/0351994 A1* 11/2023 Vance .................. G10K 11/355

* cited by examiner

*Primary Examiner* — Naishadh N Desai
(74) *Attorney, Agent, or Firm* — Messner Reeves LLP

(57) ABSTRACT

A motor assembly for rotating an underwater mounted device around a troll motor shaft. The motor assembly may have a hub fix part, a top ring, a gear ring having an inner surface covered with a plurality of gear teeth, a bottom ring, a motor mounting plate, a stepper motor attached to the motor mounting plate, a stepper motor shaft rotated by the stepper motor and a spur gear pinion attached to the stepper motor shaft. The hub fix part, top ring, gear ring, bottom ring and motor mounting plate are configured, when positioned on top of each other, to form an inner chamber in the motor assembly. The stepper motor may rotate the spur gear pinion inside the chamber. The spur gear pinion may engage with the plurality of gear teeth of the gear ring to thereby rotate the motor assembly about an axis of the troll motor shaft.

19 Claims, 19 Drawing Sheets

900

1220

940

1280

2100

1210

2100

1210

1240

1260

1250

1230

TRANSDUCER MOUNT SYSTEM

CROSS REFERENCE TO RELATED APPLICATIONS

This patent application is related to U.S. Provisional Patent Application No. 63/470,728, filed on Jun. 2, 2023, titled Transducer Mount System which is hereby fully incorporated by reference.

BACKGROUND OF THE INVENTION

Field of the Invention

The overall field of this invention is directed to a mechanism for horizontally rotating an underwater mounted device around a troll motor shaft. The mounted device may be, as examples, a sonar transducer or an optical camera.

Discussion of the Related Art

There are many different types of fish finding mounting devices on the market, each designed for a particular purpose or suitable for a different task or surface. A transducer is a device that converts electrical signals into sound waves or acoustic energy when submerged in the water. These waves/pulses are sent outward into a body of water and when these waves encounter objects it produces echoes. These echoes travel back to the transducer and are converted back into electrical signals which are then translated into useful data about the body of water. Data that is interpreted from the sound pulses include data such as, without limitation, the depth of the body of water, the type of terrain, fish and other important types of information. The transducer is also useful to assist an angler or other type of fisherman to locate fish.

Normally, a transducer will be mounted on a pole or directly on the troll motor shaft. A trolling motor is often a small electric motor with a propeller to move the boat quietly through the water while fishing. The trolling motor is usually affixed to an angler's boat, either on the stern or the bow and a shaft extends downward with the propeller on the end that enters the water.

Some recent troll motors have a built in GPS. This allows an angler or other type of fisherman to lock the position of the boat in the water to stay in the exact position. The motor shaft has to spin occasionally from side to side to maintain the position of the boat. In doing so, if the transducer is mounted on the troll motor shaft, the transducer will also move or spin every time the motor shaft spins. This does not allow the transducer to stay on the targeted area.

There are products on the market that use a system independent of the troll motor. These types of products use a pole that may be mounted on to the boat's transom, side, or onto another location on the boat. Oftentimes, the transducer is mounted to the portion of the pole that enters the water. Customarily, these products will use a manual or a hand operated switch solution to turn the pole and hence the transducer to scan the water for fish. This can be cumbersome and inefficient if the angler has to free a hand from the fishing pole to manually turn the pole with a handle or use a switch to adjust and target the viewing areas.

Some fish finders have live sonar capabilities. Live sonar provides a real-time image of what the transducer is pointing at and displayed back to the user on a graphical interface. These live sonar devices are directional and can point forward, down or in a prospective/scalp mode. The angler can only select one mode at a time and this procedure to change the mode is accomplished by manually rotating the transducer. This requires the transducer to be pulled out of the water and adjusted. This is time consuming, could be unsafe if the angler who has to reach over the edge of the boat and can also distract fish that are in the area.

Thus, there exists a need for an improved mounting system for a mounted device which allows the angler to keep their hands on their fishing pole while adjusting the mounted device.

SUMMARY OF THE INVENTION

The presently disclosed system positions and orientates a mounted device used for fishing. The system may be generally mounted to a boat through the use of a mounting plate. The mounting plate includes an aperture that sits away from the boat and is designed to hold a vertically oriented pole in place. The vertical pole is secured to the mounting plate through the aperture, and the pole can freely rotate/spin about its vertical axis in the aperture. The pole has an upper end that extends above the aperture, and a lower end that extends below the aperture. The lower end of the pole may be attached to a motor assembly. The motor assembly may rotate or pivot the mounted device in one or a plurality of axes.

A motor, typically a DC motor, is attached to the upper end of the pole, and functions to spin the pole, thereby turning or rotating the motor assembly (and the attached mounted device) mounted to the pole. The motor includes a shaft to which the pole is attached. The shaft imparts a spin speed to the pole and a pole spin direction which is either clockwise or counterclockwise.

The system may include a motor controller that receives input from a motor power switch, speed switch, and direction switch to control and adjust power to the motor, along with the spin speed and direction imparted to the pole by the motor shaft.

A power source is connected to the controller to provide power to the motor.

The system may also include an indicator dial that indicates the direction of spin imparted to the pole by the motor. This allows a visual inspection of the dial to reveal the spin direction/speed of the rotation of the pole, and thereby the mounted device, caused by the motor.

The direction switch is preferably controlled by a user's foot. The direction switch may contain a pair of foot operated pucks, such that the first puck directs the motor to impart a clockwise spin to the pole, while the second puck directs the motor to impart a counterclockwise spin to the pole. In other embodiments, hand switches or voice commands may be used to control the rotation of the pole.

One or more additional direction, speed switches, possibly mounted on the motor controller, may be used to control the rotation or pivoting of the mounted device by a submersible motor. In other embodiments, hand switches or voice commands may be used to control the movement of the mounted device by the submersible motor.

A motor assembly may have a pole receptacle, a submersible motor and a mounted device coupler. A rotatable pole may be inserted into the pole receptacle. The length of the pole controls the depth that the motor assembly is submerged beneath the water. The pole may be rotated about its vertical axis to thereby rotate/spin the motor assembly. A mounted device may be attached to the submersible motor via a mounted device coupler. In preferred embodiments, the mounted device coupler allows different types of mounted devices to be easily taken on and off. The submersible motor may rotate the mounted device coupler attached to the mounted device. The rotatable pole and mounted device coupler thus provide at least two axes of rotation for the mounted device.

Accordingly, the disclosed motorized pole mounting system allows a user to conveniently control and rotate a motor assembly attached to the pole without taking one's hands off of their fishing pole. This advantage and others provided by the system are further described herein.

Another embodiment of the invention relates to an underwater mechanism for rotating a mounted device around a troll motor shaft. The mechanism may have a mounting ring comprising an outer mounting ring and an inner mounting ring. The outer mounting ring preferably has an outer surface to prevent water and debris from entering the mounting ring.

In a first possible embodiment, the outer mounting ring may also have an inner surface covered with a plurality of outer gears and the inner mounting ring may have an outer surface covered with a plurality of inner gears. In a second possible embodiment, the outer mounting ring may have an inner surface covered with a plurality of outer gears, but the inner mounting ring does NOT have an outer surface covered with a plurality of inner gears. In a third possible embodiment, the outer mounting ring does NOT have an inner surface covered with a plurality of outer gears, but the inner mounting ring does have an outer surface covered with a plurality of inner gears.

The inner mounting ring may also have a cylindrical inner surface configured to be securely attached to the troll motor shaft. A mounted device coupler may be attached to the outer mounting ring and the mounting device coupler may be configured to be attached to a mounted device. Mounting hardware may be attached around a troll motor head for added structural stability. Support brackets may be attached to the mounting ring and the mounting hardware to further improve the structural integrity of the underwater mechanism.

An electric motor may be operably connected to the mounting ring to allow horizontal rotation of the mounted device attached to the outer mounting ring in either a clockwise direction at a first time or a counter-clockwise direction at a second time around a vertical axis of the troll motor shaft. The electrical motor may be able to rotate a shaft and an attached motor rotatable gear.

In a first embodiment, the motor rotatable gear may be positioned to mesh between the plurality of inner gears and the plurality of outer gears. In a second embodiment, the motor rotatable gear may be positioned to mesh with the plurality of inner gears. In a third embodiment, the motor rotatable gear may be positioned to mesh with the plurality of outer gears.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
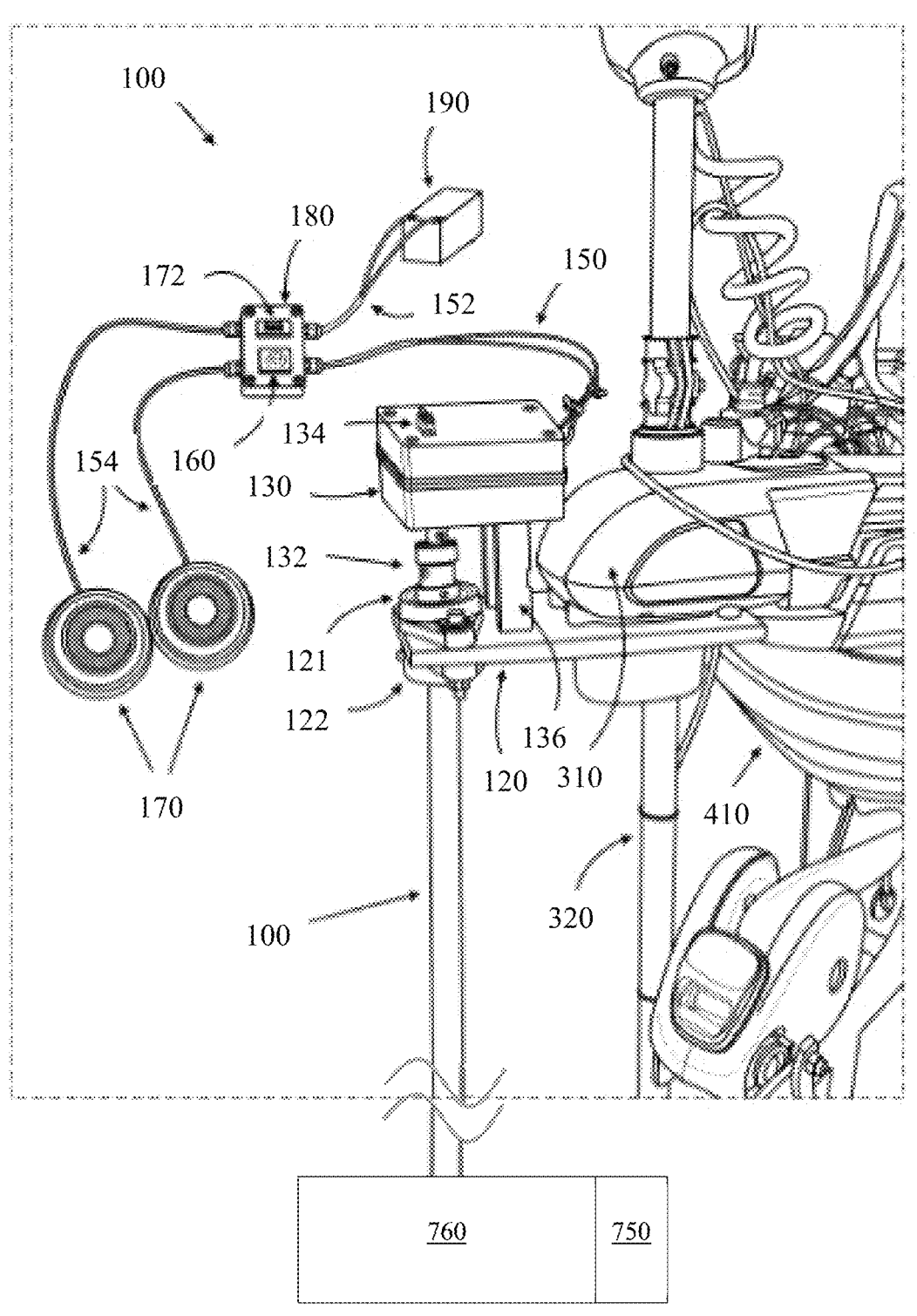
FIG. 1 is an illustration showing the assembled components of a motorized pole mount system for a mounted device.

In the Summary above, this Detailed Description, the claims below, and the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

("Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The following disclosed apparatus may be used to assist an angler in locating a direction and/or depth of one or more fish in a body of water. The apparatus may have means to control the movement of a mounted device, i.e., a sensor. The mounted device may use any desired detection technology. As non-limiting examples, the detection technology may be based on sonar or optical technologies.

In some embodiments, the mounted device may be able to be moved in one, two, three or more axis. In preferred embodiments, the mounted device may be rotated around a substantially vertical pole and/or pivoted underwater by a motor assembly. As the angler will likely have a fishing pole in their hands, the controls preferably do not require the use of the hands of the angler, but may be controlled by any other desired means. As non-limiting examples, the movement of the mounted device may be controlled by either one or two feet pressing on specially configured foot pads or be voice controlled.

The information from the mounted device may be communicated to the angler by any desired means. As non-limiting examples, the information may be communicated to the angler either on a screen or through one or more speakers.

In a preferred embodiment, a motor assembly may have a pole receptacle configured to securely attach a pole, where the pole may be rotated around a first axis along the length of the pole. The motor assembly may have a submersible motor attached to the pole receptacle and be configured to rotate the mounted device in a second axis that is different from the first axis. The motor assembly may also have a mounted device coupler, attached to the submersible motor, that is configured to securely attach the mounted device to the submersible motor.

With reference now to the accompanying figures, FIGS. 1-7 illustrate an exemplary configuration of a motorized pole mount system 100. The motorized pole mount system 100 may be generally designated for use with a motor assembly 760. The motor assembly 760 may be connected to a mounted device 750, typically a type of fish finding device, through a mounted device coupler 740. As non-limiting examples, the mounted device 750 may be a transducer, sonic transducer, optical camera, low light camera, infrared camera, thermal imaging camera or any other item that an angler may be interested in mounting on the motor assembly 760 for use while fishing.

Figure 2:
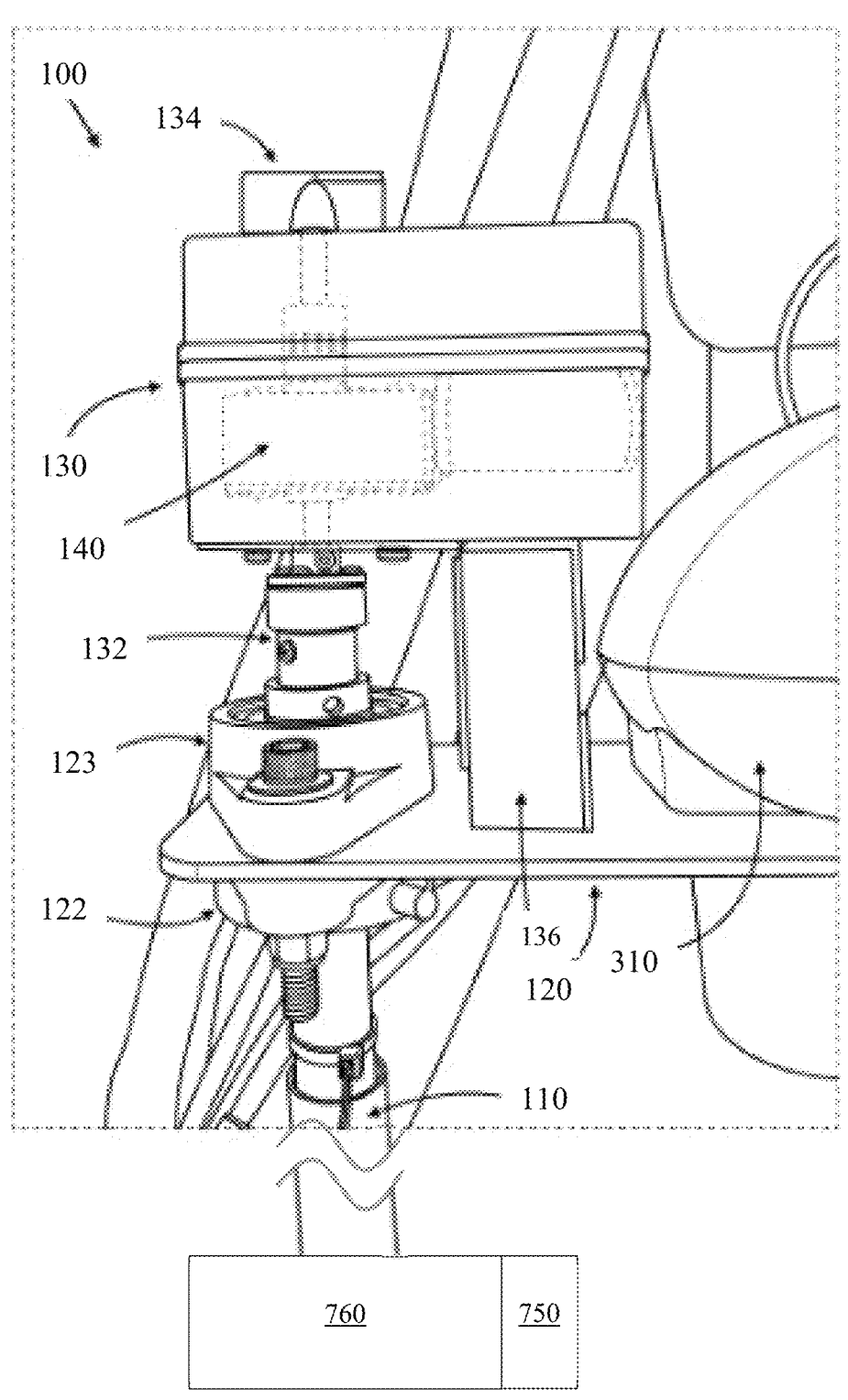
FIG. 2 is an illustration showing a dual shaft motor within a motor housing of the motorized pole mount for the mounted device.

With reference to FIG. 1, a motorized pole mount system 100 (which is also shown in FIG. 2) may include a pole 110, a mounting plate 120, one or more flange bearings 121, 122, a motor housing 130, a coupling sleeve 132, an indicator dial 134, a support brace 136, a wire 150 connected to the motor 140, a speed switch 160, a motor power switch 172, spin direction controlling foot pucks 170, direction controlling dual wires 154, a DC motor controller 180 for a motor, a power source 190, and a power source wire 152. In one or more non-limiting embodiments, power source 190 may be a 12 volt up to a 36-volt battery or another type of battery.

The motorized pole mount system 100 may be used to adjust the depth and rotation direction of the mounted device 750, independent of the movements of a troll motor. The device includes a mounting plate 120 configured to conform to, and fit around, a troll motor that may be mounted on the boat. The mounting plate 120 forms the base or the foundation which holds the remainder of the assembly together. The mounting plate 120 may be fashioned from a sufficiently strong material which may include, but is not limited to, steel, aluminum, metal alloys, plastics, resins, and combinations thereof.

As shown in FIG. 2 and comprising part of the motorized pole mount system 100 are a motor 140 (within the motor housing 130; see FIG. 2) which is configured to spin the pole 110. Also comprising part of the motorized pole mount system 100 is a support mount to securely hold and support the pole 110 to a troll motor shaft 320 when not in use.

The motorized pole mount system 100 may include a pole 110 that is independent of a troll motor shaft 320. The pole 110 typically will be fashioned from a strong metal and have a cross section of a circle. The pole 110 is arranged through the aperture and the pair of flange bearings 121, 122 on the motorized pole mount system 100. A motor assembly 760 may be mounted on the distal end of the pole 110, i.e., the end below the mounting plate 120 that enters the water. The proximal end of the pole 110, or the end that is above the mounting plate 120, is configured to be secured to a motor 140, and is controlled by the motor 140 such as to rotate the pole 110 clockwise and counterclockwise.

Figure 7:
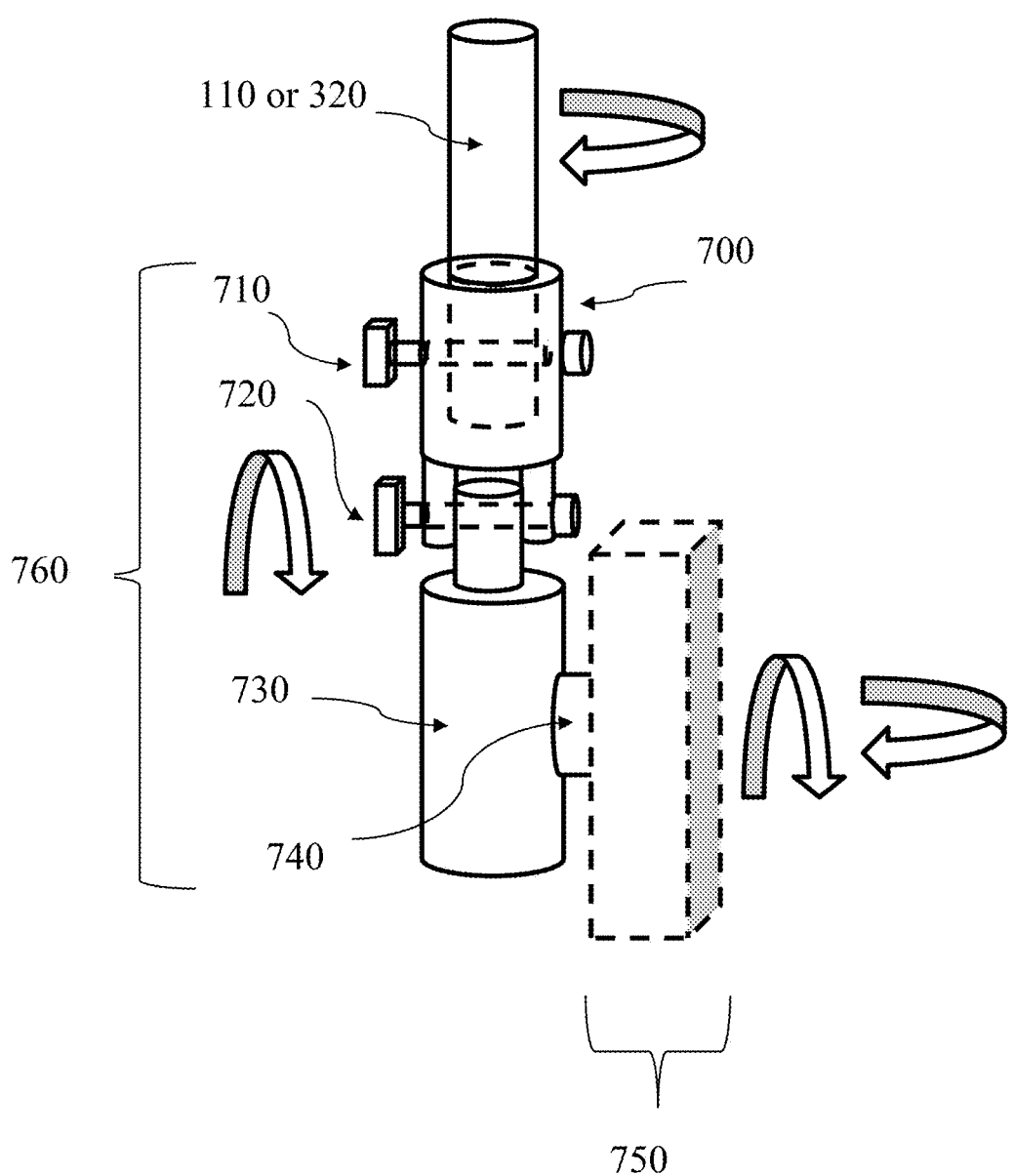
FIG. 7 is an illustration showing an embodiment of a motor assembly attached to the pole and the mounted device attached to the motor assembly.

As shown in FIG. 7 the motor assembly 760 is illustrated which includes a pole receptacle 700, a submersible motor 730 and a mounted device coupler 740. The motor assembly 760 may be attached to the pole 110 via the pole receptacle 700 and the motor assembly 760 may be attached to a mounted device 750 via the mounted device coupler 740.

The pole 110 may be attached to the motor assembly 760 which is attached to, and able to rotate, a mounted device 750. The mounted device 750 may be attached to the distal end of the pole 110, or more specifically, the end which is intended to or configured to be submerged underwater in a body of water such as a river, stream, lake, pond, ocean, or any other body of water. The mounted device 750 is preferably easily securely attached and removed from the mounted device coupler 740 so that different types of mounted devices 750 may be used with the motorized pole mount system 100. However, in other embodiments the mounted device may be more securely attached to the mounted device coupler 740 to prevent possible loss of the mounted device 750. The mounted device 750 may be attached to the mounted device coupler using one or more fasteners, bolts, screws, clamps, brackets, adhesives, or any other desired means of attaching the mounted device 750 to the mounted device coupler 740 of the motor assembly 760.

Figure 5:
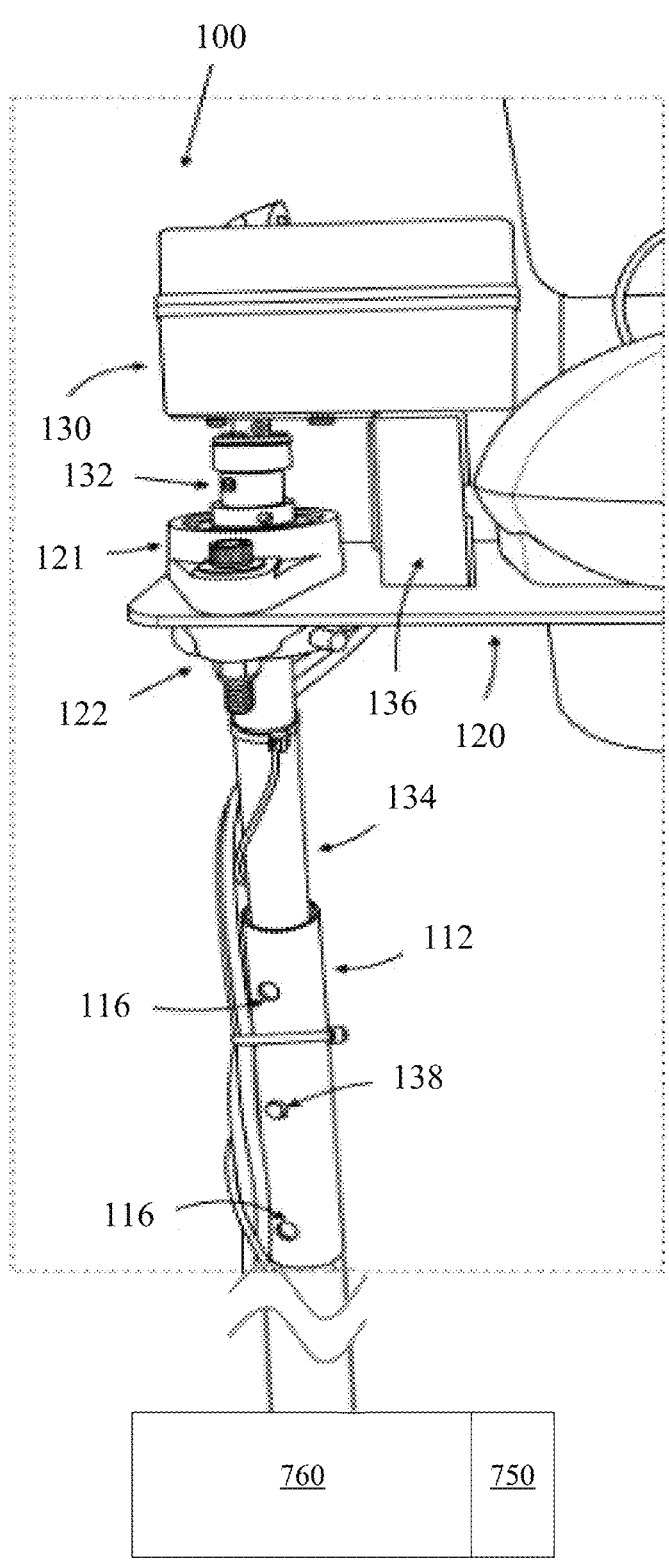
FIG. 5 is an illustration showing a perspective view of the adjustable pole assembly.

The pole 110 may be made of any material. Preferably, the materials used to manufacture the pole 110 may be rust proof materials as the pole 110 is intended to be frequently used and submerged in water. Further, in one or more non-limiting embodiments, the pole 110 may be of a fixed length. Alternatively, the pole 110 may be adjustable where the angler may adjust the length by elongating the pole 110 or shortening the pole 110 to bring the pole 110 up closer to the surface of the water to accommodate the distance from the mount to a suitable distance in the water as different watercraft vary in distance from deck of boat to water surface. As illustrated in FIG. 5, an adjustable pole 110 is shown. In this non-limiting embodiment, pole 110 may be comprised of at least two elongated members, wherein one member is an elongated hollow member 112 that is slidably connected to the second elongated hollow member 114 such that the second elongated hollow member 114 fits inside the elongated hollow member 112. The elongated hollow member 112 is configured to slide up and down the second elongated hollow member 114 to vertically adjust the length of the pole. In this non-limiting embodiment, the elongated hollow member 112 is provided with a plurality of holes 116 which are arranged vertically and in line with each other on one side of the elongated hollow member 112. The plurality of holes 116 may also be provided on two sides of the elongated hollow member 112 such that the two sides are opposite each other. The second elongated hollow member 114 will be provided with a push button 118 such that the push button 118 fits securely through the one such hole in the plurality of holes 116 in the elongated hollow member 112. The push button 118 may also be arranged where there are two buttons, one opposite the other. The angler may adjust the length of the pole 110 by pressing on the push button 118 to push it in and then sliding the elongated hollow member 112 over the second member and to the desired position and releasing the push button 118 at the appropriate hole in the plurality of holes 116 in the elongated hollow member 112. Alternate means of adjusting the pole are also within the scope of the presently disclosed system, such as and not limited to a telescoping means and an electronically controlled means.

The pole 110 may have a proximal and distal end, whereby the pole 110 may be fitted through a central opening/aperture located on mounting plate 120 such that the proximal end and distal end are above the mounting plate and below the mounting plate, respectively. Additionally, the pole 110 may also be slid through openings in the center of the two flange bearings 121 and 122 shown in FIGS. 1-2 and 4-6. As shown in these figures, pole 110 may slide through an opening in the mounting plate 120 and an opening in flange bearing 121 and flange bearing 122. In one embodiment, the flange bearing 121 may be connected to and on a top surface of mounting plate 120 and the second flange bearing, flange bearing 122, may be connected to and on the bottom surface of the mounting plate 120 as can be seen in FIGS. 1 and 2.

FIGS. 1 and 2 illustrate a mounting plate 120. The mounting plate 120 may be made of any material. The mounting plate 120 may be used to mount the pole 110. In one or more non-limiting embodiments, the mounting plate 120 may be configured to connect or attach to the troll motor 310 (or other type of motor that operates a boat) as illustrated in FIG. 1. Accordingly, the mounting plate 120 may have at least a first opening on one side adapted for the pole 110 to be slide through and may also have a second opening so the mounting plate 120 may be secured to troll motor 310 or otherwise held in place. In one embodiment, the mounting plate 120 may be used to mount the pole 110 to a troll motor 310. It is noted that the troll motor 310 is only one example of a motor that may be used or selected to operate a boat. The present invention is not limited to any specific type of electrical or mechanical motors, and any suitable motor may be used to operate the boat or other assembled elements described herein.

The mounting plate 120 preferably comprises one piece which may be fashioned as a flat plate and includes an aperture opposite the side that connects to the troll motor 310. The aperture may be fashioned to receive the pole 110 through it such that the pole 110 is oriented vertically and is rotatable within the aperture. In a preferred embodiment, the mounting plate 120 may further be comprised of a pair of flange bearings 121, 122, such that one flange bearing 121 is located on a top surface of the mounting plate 120 over the aperture and a second flange bearing 122 is located on a bottom surface of the mounting plate 120 under the aperture. In this embodiment, the pair of flange bearings 121, 122 lie over and under the aperture such that the pole 110 that is configured to slide through the aperture in the mounting plate 120 and be oriented vertically and is rotatable or spun around an axis defined by the length of the pole within the aperture, but constrained by the pair of flange bearings 121, 122.

In one or more non-limiting embodiments, a motor 140 may be operated and functions to turn/spin/rotate the direction of the pole 110 about its own length axis, which subsequently causes the orientation or direction of the mounted device 750 to change or turn as well. The motorized pole mount system 100 may utilize a motor 140, such as a dual shaft motor, as shown in FIG. 2. The dual shaft motor is characterized as having two output shafts arranged vertically with the motor. In one embodiment, the dual shaft motor may be a DC type of motor, although other types of motors may also alternatively be used. The motor 140 may be contained within a housing, such as motor housing 130 shown in FIGS. 1 and 2. The motor 140 is positioned within the motor housing 130 such that one output shaft of the motor 140 extends vertically upward, and the other output shaft extends vertically downward. The dual output shafts of the motor 140 spin simultaneously in the same direction. The motor housing 130 may be supported to the mounting plate 120 via a support brace 136. The support brace 136 may be made of any material, such as, but not limited to, steel, aluminum, plastic, and a combination of materials.

The motor 140 is configured to connect to the proximal end of the pole 110 at the output shaft extending downward. The downward extending output shaft of the motor 140 may connect directly to the proximal end of pole 110 or via a coupling sleeve 132. Coupling sleeve 132 may be made of any material known in the art. While not shown in the figures, in other non-limiting embodiments, the motor 140 may be directly attached to the pole 110. The motor 140 may be removably or permanently attached to the pole 110 using any means of attachment known in the arts, including via fasteners, adhesives, couplers, soldering, welding, or any other desired means.

Figure 4:
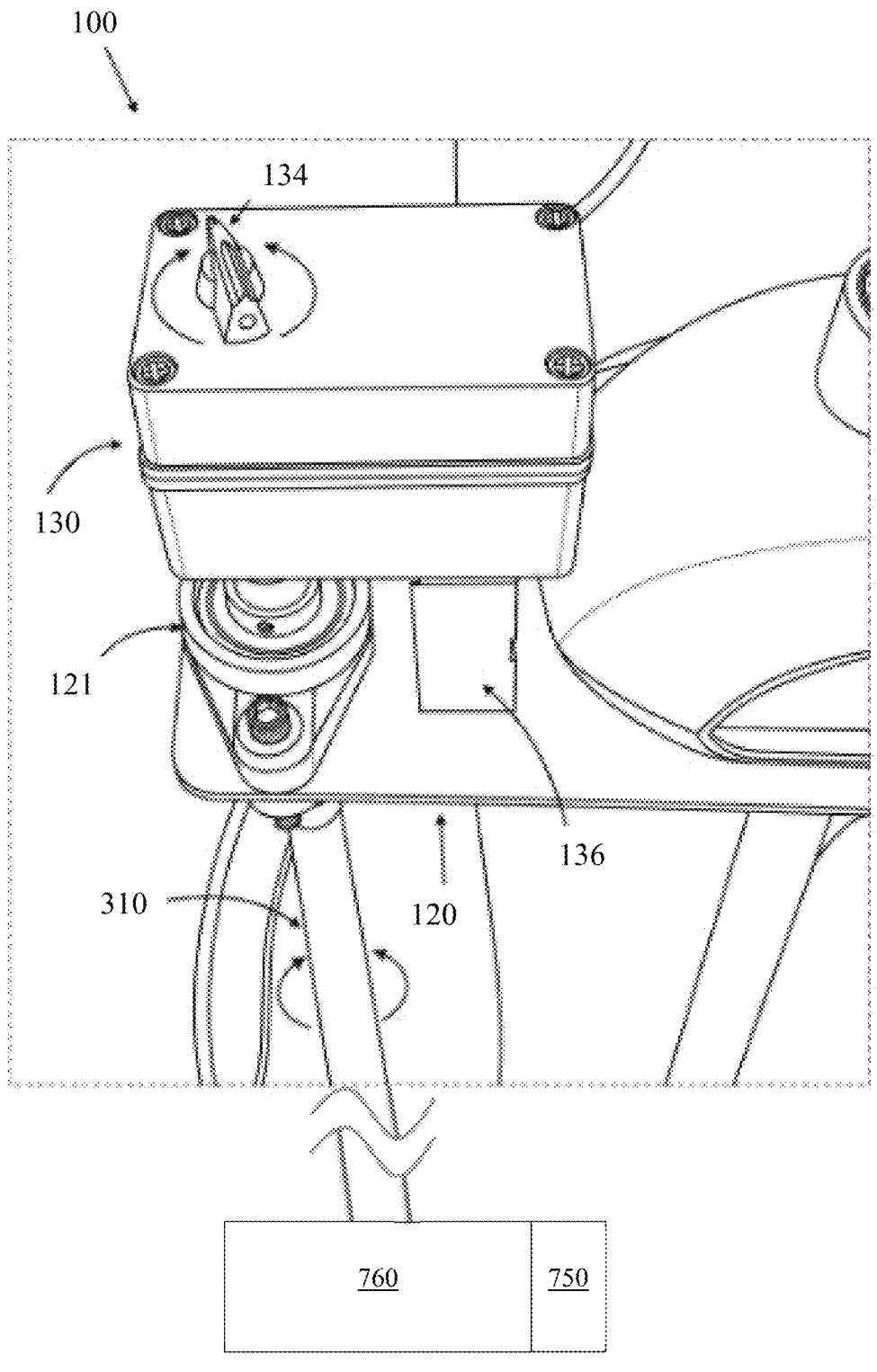
FIG. 4 is an illustration showing a close-up perspective view demonstrating the spin motion of the indicator dial and the pole.

FIG. 2 also illustrates an indicator dial 134 which is positioned on top of the motor housing 130 and is configured to connect to the motor 140 at the output shaft that extends vertically upward. As illustrated in FIG. 4, the indicator dial 134 spins simultaneously with the pole 110 and indicates the spin direction of the pole and also the speed at which the pole is spinning.

Further, in this non-limiting embodiment, a motor controller (not shown in the figures) will be contained within a DC motor controller 180 shown in FIG. 1. The motor controller is used to control and adjust the power level, direction, and speed of motor 140. The motor controller is configured to receive information from a motor power switch 172, the speed switch 160, and a direction switch to control and adjust the motor's power, spin speed imparted to the pole by the motor, and the spin direction imparted to the pole 110 by the motor 140. The speed switch 160 and the motor power switch 172 may be positioned on the DC motor controller 180 and connected to the motor controllers via one or more wires.

Alternate connections may include a wireless connection. The speed switch 160 and the motor power switch 172 are configured to communicate to the motor controller to adjust the spin speed of the motor and turn the motor 140 on and off, respectively. The motor controller is configured to receive the information from the speed switch 160 and the motor power switch 172 to further communicate with the motor 140 through a wire connection, such as wire 150.

Figure 3:
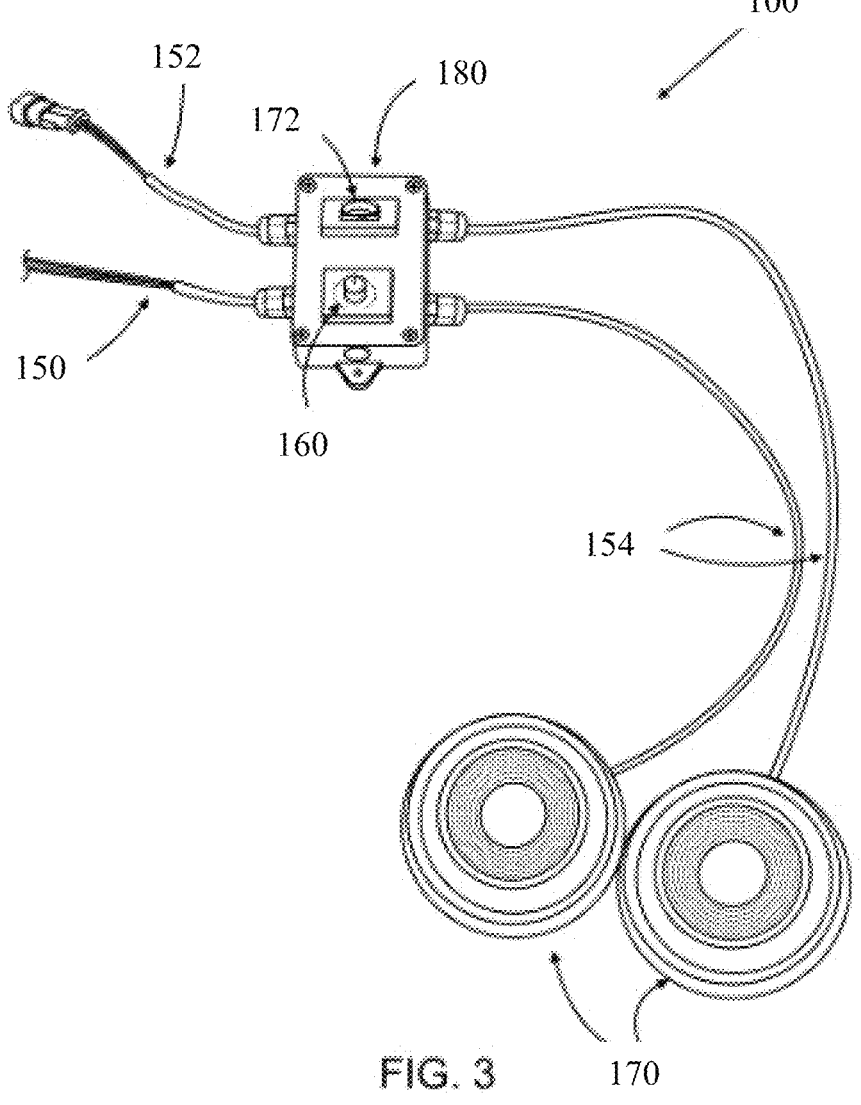
FIG. 3 is an illustration showing a close-up perspective view of the controller housing with the motor power switch and variable speed switch positioned on top of the controller housing which is connected to the pair of spin direction controlling pucks via wires.

The speed switch 160 is configured to control the spinning speed of the motor shaft, which is imparted to the pole 110. The speed switch 160 is connected to the motor 140 through the motor controller. Thus, the motor controller may be used to control and to adjust the power and speed of the motor which in turn would control the power to and spin speed of the pole 110 which in turn is connected to the mounted device. In one or more non-limiting embodiments, speed switch 160 may be a dial switch, such as shown in FIG. 3. The dial may be turned one way or the other to adjust the speed of the shafts of the motor 140 which in turn spins the pole 110 as shown in FIG. 1 and FIG. 2. The power source 190 may function to provide power to the motor or other elements as needed. As noted above, in one or more embodiments, the power source 190 may be a 12 volt to 36-volt battery usually found on a boat or as known in the art by those of ordinary skill. The power source 190 would also be connected to the motor controller housed within the DC motor controller 180 through a wire, such as power source wire 152. FIG. 3 also illustrates a motor power switch 172 to turn the motor on or off. The motor power switch 172 turns the power to the motor (140 in FIG. 2) on and off. The motor power switch 172 communicates with the motor controller which then communicates with the motor 140.

In the preferred embodiment, the direction switch is configured to control the spin direction of the shaft of the motor 140 which in turn spins the pole 110 and thus rotates or spins the mounted device 750 mounted to the end of the pole 110. FIG. 1 and FIG. 3 illustrate the direction switch which may be in the form of foot pucks 170. The foot pucks 170 (i.e. direction switches) may be configured to communicate with the motor controller through dual wires 154. The dual wires 154 will relay information from the foot pucks 170 to the motor controller housed in the DC motor controller 180. The motor controller in turn will communicate with the motor 140 (FIG. 2). The foot pucks 170 are configured to control the spin direction of the pole 110 such that one puck is configured to cause the pole 110 to spin clockwise and the other puck is configured to cause the pole 110 to spin counterclockwise.

Alternative embodiments of a direction switch are within the realm of this disclosure and may include a foot pedal and a switch which can be accessed by a foot and/or hand.

The DC motor controller 180 may also contain a wireless unit (not shown in the figures). The wireless unit will be wirelessly connected to the motor 140 and will be configured to control the spin direction of the pole 110. The wireless unit will be provided with a remote (not shown in the figures). The remote will have controls on it to select the spin direction of the pole 110.

A support mount (not illustrated in the figures) may preferably be the means by which the pole 110 is secured in place when not in use. The support mount may be a rod with support cups or other means on each end wherein one end may be used to support pole 110 and the other end may rest against the troll motor shaft 320. Other means to support pole 110 when not in use are within the scope of the presently disclosed system.

Figure 6:
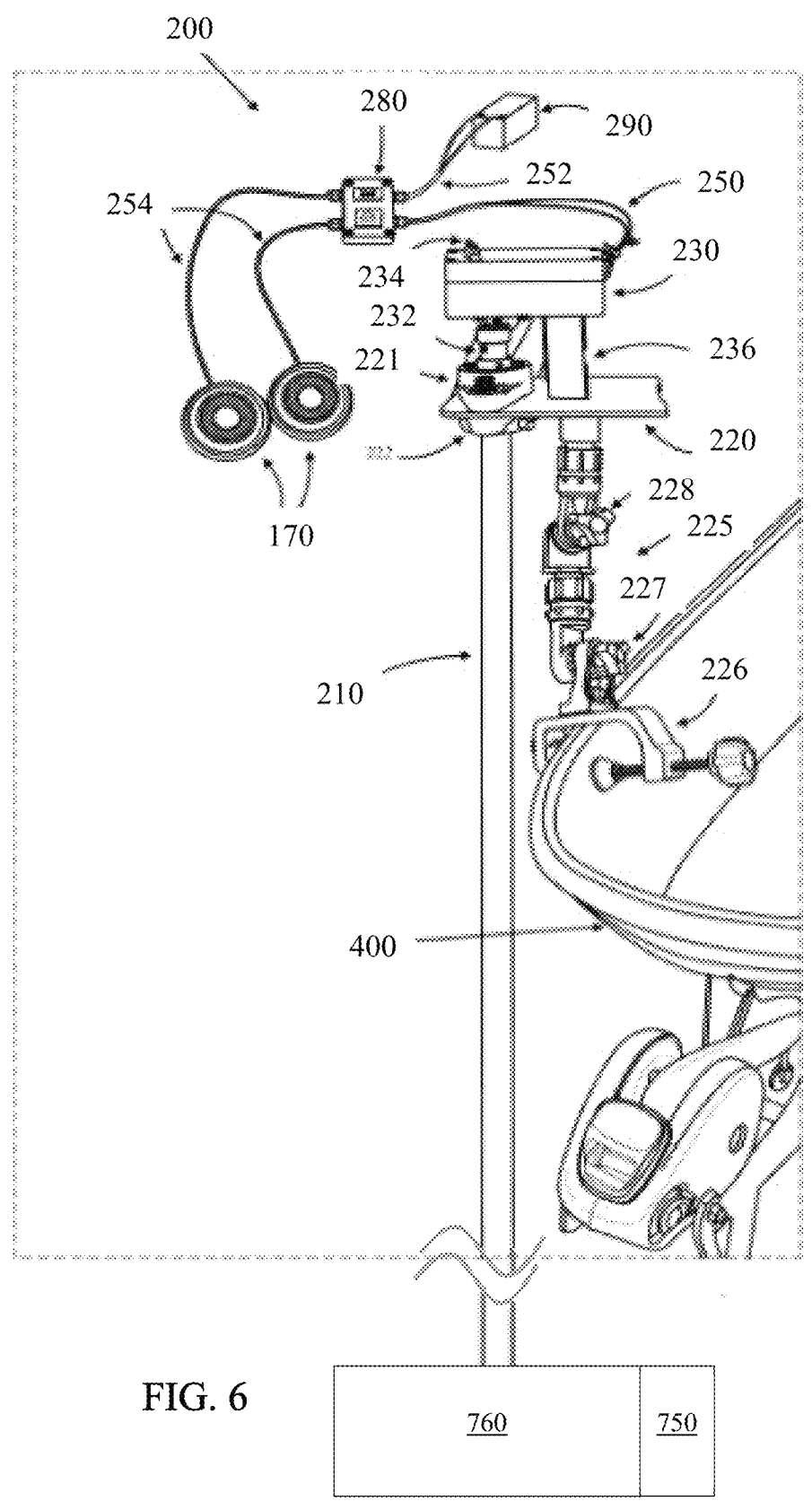
FIG. 6 is an illustration showing an alternate embodiment of a motorized pole mount system with a clamp device for attaching to the boat.

In one or more alternate embodiments, the mounting plate 120 may be adapted to mount the motorized pole mount system 100 anywhere on the boat, including on the side, front, or back of the boat. FIG. 6 illustrates a motorized pole mount system 200, which includes an alternative means to attach the assembly to a boat. The motorized pole mount system 200 may include a clamp device 225 to mount the system to a boat 400. The clamp device 225 will be connected to the mounting plate via any means known in the art such as fasteners, coupler, soldering and welding. The clamp device 225 will be comprised of a clamp 226 with an adjustable knob, and at least two arms with knobs 227 and 228 which allow the arms to pivot at those axes so that the arms can be adjusted by bending them as desired to position a pole 210 vertically in the water. The motorized pole mount system 200 will also be comprised of the pole 210, a mounting plate 220, one or more flange bearings, such as flange bearings 221 and 222, a motor housing 230, a coupler 232, an indicator dial 234, a support brace 236, a motor wire 250, a speed switch 260, a motor power switch 272, spin direction controlling dual pucks (foot pucks 170), direction controlling dual wires 254, a DC motor controller housing 280, a power source 290, and a power source wire 252. Not shown in the figures and comprising part of the motorized pole mount system 200 are a motor which is configured to spin the pole 210 and a support mount to support the pole 210 to the clamp device to secure pole 210 when not in use. The components will be positioned, configured, and function in a similar fashion as described for the previous embodiments.

The present disclosure recognizes the unsolved need for a motor assembly 760 that can accommodate any type of mounted device 750 that an angler is interested in mounting on the motorized pole mount system 100. The unsolved need is accomplished by a motor assembly 760 that is mounted to a pole 110 which is independent of the troll motor shaft 320 or to the troll motor shaft 320 itself. The mounted device 750 that an angler is interested in mounting, is mounted on a mounted device coupler 740, which is attached to a submersible motor 730, which is mounted to the distal end of the pole 110 or shaft of troll motor entering the water. The submersible motor 730 is preferably located underwater, but may be located above the surface of the water in some embodiments to rotate the mounted device 750 from one point to another. These points can be controlled and customized by the control box that the angler uses to active the submersible motor 730. The control box has multiple inputs that allow the angler to select from a menu which mounted device 750 (typically a type of fish finder) is installed, i.e., mounted on the motor assembly 760 via the mounted device coupler 740.

The angler can also manually adjust the points that the submersible motor 730 may rotate to using switch inputs and a display to show a current swing pattern. The angler may activate the motor assembly 760 by a foot, hand or wireless switch. Thus, this motor assembly 760 is suitable for casing the tedious process of adjusting the mounted device 750 by rotating the mounted device 750 to various different positions and/or modes that the fish finder supports without having to raise the mounted device 750 out of the water and manually change the mode or adjust the position of the mounted device 750. The invention can be used with any type of mounted device 750 and allows the angler to rotate the mounted device 750 with the invention using the switch which may be used by the foot, hand, voice commands, or wireless remote.

With reference now to FIG. 1-3, one exemplary embodiment of the motorized pole mount system 100, according to the present invention is generally designated, for use with a mounted device 750, such as a fish finding device. The motorized pole mount system 100 includes a pole 110, a mounting plate 120, flange bearings 121, 122, a coupling sleeve 132, a motor 140 (preferably a DC motor), a wire 150, a speed switch 160 (which may be a variable speed switch), a normally open switch for spin direction (which may be foot pucks 170), a DC motor controller 180, and a power source 190.

The motorized pole mount system 100 may be configured as follows: the pole 110 may be attached to the motor assembly 760 on the pole's distal end which enters the water. The pole 110 may be attached to a mounting plate 120 and held in place with two flange bearings 121, 122. The motor 140 may be connected directly to the proximal end of the pole 110 or via a coupling sleeve 132. The mounting plate 120 may be used to mount the pole to a troll motor 310. A speed switch 160 (which may be a variable speed switch)

may control the spinning speed of the pole is connected to the motor 140 via a wire 150. The wire 150 may also connect to a normally open switch (which may be one or more foot pucks 170) which controls the spin direction. The DC motor controller 180 may be used to interface power, direction, and speed to the motor. The power source 190 may be used to power the DC motor.

The pole 110 may be made of any rust proof material. In one or more non-limiting embodiments, the pole 110 may be of a fixed length or it may be adjustable where the angler can adjust the length by elongating the pole 110 to scan deeper underwater or shortening the pole 110 to bring the mounted device 750 closer to the surface. The pole 110 may have a first and a second end wherein the first end may be fitted through a mounting plate 120 by sliding the pole 110 through two flange bearings with one flange bearing 121 on the top part of the mounting plate and the second flange bearing 122 on the bottom part of the mounting plate as illustrated in FIG. 5.

The mounting plate 120 may be made of any rigid material and is used to mount the pole 110. In one or more non-limiting embodiments the mounting plate 120 may be used to attach to a troll motor 310 as illustrated in FIG. 1-5. As shown, the mounting sleeve does not attach to the troll motor shaft 320 which has to spin from time to time to hold the exact spot that the angler locked the position of the boat. The mounting sleeve holds the components of the pole 110 which is not attached to the troll motor shaft 320 and thus does not move when the troll motor shaft spins. In one or more non-limiting embodiments, the mounting plate 120 may be adapted to mount the pole assembly on the side, front or back of the boat.

In one or more non-limiting embodiments, the motor 140 rotates or spins the pole 110 around the pole's length axis. As illustrated in FIGS. 1-4 and 6, the motor 140 is attached to the mounting plate 120. The motor 140 may be connected to the pole 110 via a coupling sleeve 132. The coupling sleeve 132 could be made of any material known in the arts that is used to make coupling sleeves. In other non-limiting embodiments, the motor 140 may be directly attached to the pole 110.

The DC motor controller 180 may be used as the interface for power, direction and speed to the motor 140. The wire 150 connects the DC motor controller 180 to the motor 140. A power source 190 powers the motor 140. In one or more non-limiting embodiments, the wire 150 may be connected to the motor 140 from the power source 190 through the DC motor controller 180 to the three-position open switch and the speed switch 160. In other non-limiting embodiments, the motor 140 may have an integrated DC controller. In those embodiments, the wire 150 would connect the power source 190 to the three-position open switch (which may be foot pucks 170) and the speed switch 160.

The speed switch 160 is connected to the motor 140 via the wire 150 and is used to adjust the speed at which the motor 140 will spin the pole 110. In one or more non-limiting embodiments, the speed switch 160 may be a dial switch. The dial switch is preferably placed in the area of the boat near where the motorized pole mount system 100 is mounted on the boat. The dial may be turned one way or the other to adjust the speed the motor 140 spins the pole 110.

The three-position normally open switch (which may be foot pucks 170) turns the DC motor on and off and also controls which way the motor spins, e.g., clockwise or counter-clockwise. In the normal position, which is the open position, the switch is directing no power to the motor 140. Pressing the switch on either side will spin the motor 140 clockwise or counter-clockwise depending on the polarity. In other non-limiting embodiments, the normally open switch may be a wireless switch. The switch is preferably placed in an area of the boat near where the motorized pole mount system 100 is mounted on the boat. Further, the switch is preferably placed in an area which may be easily accessed by a foot of the angler when the switch comprises foot pucks 170.

With reference to FIG. 7, a motor assembly 760 is illustrated that may be attached to the pole 110 and may accommodate a wide variety of mounted devices 750. As non-limiting examples, the mounted device 750 may be a transducer, sonic transducer, optical camera, infrared camera, thermal imaging camera or any other item that an angler may be interested in mounting on the motor assembly 760.

The motor assembly 760 may be attached to the distal end of the pole 110 (the end intended to be submerged underwater) by any desired method. The motor assembly 760 may have a pole receptacle 700 configured to be attached to the pole 110. The attachment method may be any desired method, but preferably keeps the pole 110 securely attached to the pole receptacle 700 and allows the motor assembly 760 and the mounted device 750 to rotate when the motor 140 rotates the pole of the motorized pole mount system 100 around the pole's vertical/lengthwise axis.

As a non-limiting example, the pole 110 and the pole receptacle 700 may be created as one continues member. In another example, the pole 110 may be wielded or glued into the pole receptacle 700. In yet another example, the pole 110 may have threads on its distal end and may be screwed into threads of the pole receptacle 700.

In yet another example, the pole receptacle 700 may have an indent, cavity or be hollow and the pole 110 may be placed inside the indent, cavity or hollow space of the pole receptacle 700 of the motor assembly 760. Holes may be made in the pole 110 and the pole receptacle 700 such that a receptacle pin 710 may be inserted through the holes once the pole 110 has been inserted into the indent, cavity or hollow space of the pole receptacle 700. The receptacle pin 710 may have a head larger than the holes on one end and either a nut or a Cotter pin may be used on the other end to keep the receptacle pin 710 securely in position.

The submersible motor 730 may be connected to the pole receptacle 700 by any desired means. As a non-limiting example, the pole receptacle 700 may have two flanges/brackets and the submersible motor 730 may have one flange/bracket. The one flange/bracket of the submersible motor 730 may be configured to fit between the two flanges/brackets of the pole receptacle 700. In another embodiment, the submersible motor 730 may have two flanges/brackets while the pole receptacle 700 may have one flange/bracket configured to fit between the two flanges/brackets of the submersible motor 730. In other embodiments, other numbers and/or configurations of flanges/brackets may also be used. In these embodiments, a motor pin 720 may fit through the flange(s)/bracket(s) to connect the pole receptacle 700 to the submersible motor 730. The pole receptacle 700, motor pin 720 and submersible motor 730 may be configured so that an angle between the pole receptacle 700 (and thus the pole 110) and the submersible motor 730 may be fixed when the motor pin 720 is tightened down. These embodiments have the advantage of allowing the submersible motor 730 to be fixed at a desired angle from the axis in line with the pole 110.

In other embodiments, the pole receptacle 700 may be directly attached to the submersible motor 730 by using bracket assemblies, screws, bolts, making the two parts a single unit or by any other desired attachment means.

The mounted device 750 may be connected and controlled by a submersible motor 730 which may be located underwater during use, although the submersible motor 730 may also be located above the water. The submersible motor 730 may be used to rotate the mounted device coupler 740 to change the direction the mounted device 750 is "looking". The submersible motor 730 may be of any type, but is preferably an electric motor and is most preferably a DC electric motor powered by a battery in the boat. The submersible motor 730 may create any desired motion, such as linear or rotational. The submersible motor 730 is preferably watertight and able to work under water.

In some embodiments, the submersible motor 730 rotates the mounted device 750 back and forth in one axis while other embodiments allow the submersible motor 730 to rotate the mounted device in two axes. One axis rotation allows the submersible motor 730 to include a single motor and allows the mounted device to rotate in one axis, such as either up-down or side-to-side, but not both. In other embodiments the submersible motor 730 may include two or more motors attached to each other and this may allow, for example, the mounted device 750 to rotate or pivot in both the up-down and side-to-side directions at different, overlapping or at the same time. Thus, in some embodiments, the submersible motor 730 may be able to simultaneously adjust the mounted device 750 in two axes.

The control box may have multiple inputs that allow the angler to select from a menu to select which mounted device 750 is installed. In preferred embodiments, the angler may select a particular type of mounted device 750 (such as a particular type of sonic transducer). The field of view of the mounted device 750 may be controlled and customized by the control box that the angler uses to active the submersible motor 730.

The angler may also manually adjust the points that the submersible motor 730 may rotate to by using switch inputs. A display may be used to show a current swing pattern. The angler may activate the submersible motor 730 by any desired method. As non-limiting examples, the angler may use their foot (possibly using a pair of spin direction controlling dual pucks), hand, or voice control. These may be wired or wireless controls.

In some embodiments, the pole 110 may be rotated around the pole's length axis by the motor 140 while the submersible motor 730 independently rotates or pivots the mounted device 750 in either one or two additional axes. Thus, many of the described embodiments may provide either two or three axes of independent movement, i.e., they can move individually at different times, at substantially the same times or at overlapping times, for the mounted device 750.

The direction of the rotation/pivot, the speed of the rotation/pivot and/or the time of the rotation/pivot along each of the enabled axes may also be controlled. The spin direction foot pucks 170 may be connected to the switch and control the rotation of the pole 110. In other embodiments, additional spin direction foot pucks 170 may be attached to the DC motor controller 180 to control the movement of the submersible motor 730 in a similar manner. In this example embodiment, one pair of spin direction foot pucks 170 may control the rotation of the motor 140 and thus the rotation of the pole 110 while another pair of spin direction foot pucks 170 may control the rotation of the submersible motor 730 and thus the movement of the mounted device 750. In this example, these two sets of pucks (four pucks total) would provide 2 axes of control over the mounted device 750.

In another example, the spin direction foot pucks 170 may be used with the angler's feet to control the rotation of the pole 110, while another set of spin direction controlling foot pucks 170 may be used with the angler's hands to control the rotation of the mounted device coupler 740. Of course, the foot pucks 170 may be used to control any combination of desired submersible motor 730 and axes with any desired combination of hands and/or feet of the angler.

In another embodiment, the angler may use their voice to control the movement of the motor 140 and/or the submersible motor 730. In these embodiments, the DC motor controller 180, the angler's cell phone or any other desired location on the boat or angler's body, may have a microphone that may be used to receive voice commands. As a specific example, the angler may use relative positioning and say "Blitz, rotate the pole clockwise 10 degrees" which would cause the pole 110 to rotate clockwise 10 degrees from its current position. As another example, the angler may use absolute positioning and say "Blitz, rotate the pole to 90 degrees" which would cause the pole 110 to rotate to a position 90 degrees from a predefined home (0 degrees) position which may be defined as, for example, the front or rear of the boat. In a preferred embodiment, the home (0 degrees) position may be preselected to any position relative to the boat as desired by the angler. Alternatively, the angler may say the command "Blitz, rotate the pole to 90 degrees" which could cause the pole to rotate to 90 degrees as shown on a compass, or in this case directly cast.

The angler may also use their voice to control the submersible motor 730. As a specific example, the angler may say "Blitz, point the mounted device down 10 degrees" which could cause the submersible motor 730 to rotate the mounted device coupler 740 so as to point the mounted device 750 down 10 degrees from its current position. The angler may also use fixed positions so that the command "Blitz, point the mounted device at 45 degrees" would point the mounted device at a 45-degree angle down from the vertical. In this embodiment, 0 degrees could be interpreted as the mounted device 750 being vertical, while 90 degrees could be interpreted as the mounted device 750 being horizontal, i.e., pointing directly down. Of course, other numbering or directional schemes may be used as desired to communicate with the motor 140 and/or the submersible motor 730.

Depending on the type of mounted device 750 used, a display may be provided that displays data received from the mounted device 750. As non-limiting examples, if the mounted device 750 is a sonar transducer, a monitor may display the echoes received from the sonar transducer along with information as to the strength, direction and depth of the echoes. In another example, if the mounted device 750 is an optical or low light camera, a monitor may display the received video signal along with information as to the direction the optical or low light camera is pointed towards.

In some embodiments, one or more speakers may be used to provide information detected by the mounted device 750 to the angler. The speakers may be from the angler's cell phone, the DC motor controller 180, headphones or the speakers may be located at any other desired location on the boat. The signal processor and/or speakers preferably have a volume control so that the sounds does not become so loud as to scare the fish.

In some embodiments, the signal from a mounted device 750 may be routed to a signal processor in the DC motor controller 180 (or other desired location) to convert the signal from the mounted device 750 to an appropriate message to be transmitted by the speakers.

In some embodiments, the signal processor may perform a signal matching function by comparing the currently received signal with signals received in the past with known situations (fish types/locations/arrangements) to generate an appropriate message to be transmitted by the speakers to the angler.

In other non-limiting examples, the signal processor may include an artificial intelligence (AI) that has been trained on signals from the type of mounted device 750 to generate an appropriate message to be transmitted by the speakers to the angler.

As a non-limiting example, when the mounted device 750 is a sonar transducer, the signal processor may cause the speakers to make a clicking sound for every echo detected by the sonar transducer. In some embodiments, louder clicks may represent larger received echoes and softer clicks may represent smaller received echoes. Thus, as an example, when a school of large fish swim closely by the mounted device 750, a burst of loud (but not so loud as to scare the fish) clicks may be produced by the speakers.

As another example, when the mounted device 750 is a low light or optical camera, the video signal may be processed by the signal processor with an appropriately trained AI. Additional information may be obtained by the system if a GPS or the angler's cell phone is used to determine a location of the angler. The location of the angler may then be used in combination with a fish/location database to determine the type of fish local to that location. Thus, the signal processor and/or AI may use one or more of the current axes positions of the motor 140 and the submersible motor 730, angler location detection system, known length of the pole under water, number, size, shape, speed and depth of the fish and the fish/location database to generate, as an example, a message of "large rainbow trout 10 meters directly in front of the boat and 3 meters down" from the signal produced by the mounted device 750. Of course, the message may take any format and provide any of these datapoints as part of the message. The message may then be transmitted to the angler by the speakers.

In another embodiment, the angler may use an auto scan mode to create an automatic fish detection system. The system may be put into the auto scan mode by any desired means, such as the angler saying "Blitz, auto scan" into a microphone or by flipping an appropriate switch created on the DC motor controller 180 for this purpose. In an example embodiment of an auto scan mode, the motor 140 slowly rotates the submersible motor 730 connected to the pole 110 360-degrees (or within a range selected by the angler.) The rotation of the pole 110 may continue in the same direction (such as clock-wise) or the rotation may reverse directions every 360-degrees or after any other desired degrees of rotation. If cables are being used, such as those to control the submersible motor 730 or to receive signals from the mounted device 750, it may be desirable to reverse directions often to prevent the cables from being overly twisted and damaged. While being rotated around the pole 110, the submersible motor 730 may simultaneously pivot/rotate the mounted device 750 up and down, i.e., vertically.

The number of vertical cycles performed by the submersible motor 730 on the mounted device 750 per rotations of the motor 140 on the pole 110 may depend on the width of the field of view of the mounted device 750. A larger width of field of view by the mounted device 750 may require fewer vertical cycles per rotation of the motor 140 on the pole 110. As a non-limiting example, the submersible motor 730 may perform a plurality, such as three to five, of vertical cycles on the mounted device 750 by the motor assembly 760 for every one rotation of the pole 110 by the motor 140. Data from this process may be automatically analyzed looking for a signal (often, the largest) that may represent the largest fish in the scanned area. The signal processor and/or AI may use the collected running data previously described to generate, as an example, a message of "large school of fish 10 meters southwest and 6 meters down" based on the data produced by this auto scan. This message may then be transmitted to the angler by the speakers. The auto scan may continue with additional messages being created by the system and transmitted to the angler by the speakers either when conditions sufficiently change (a school of fish moved) or after a preselected period of time has expired (such as with a message every minute updating the angler as to the current fishing conditions).

In another embodiment, a gyro may be placed in the DC motor controller 180, on the motor assembly 760 or at any other location on the boat desired by the angler. The gyro will experience the chaotic rocking of the boat due to turbulence of the water, wind and/or movements of the angler or others on the boat. The motion detected by the gyro may be analyzed and signals transmitted to the motor 140 and submersible motor 730 in real time to stabilize the position, and thus the field of view, of the mounted device 750. This should improve the quality of the collected signal/data from the mounted device 750.

In another embodiment, the mounted device 750 may from time to time detect that the mounted device 750 is getting too close (preferably a preselected distance entered into the system by the angler) to the bottom of the lake, river, ocean, etc. A warning indication may be displayed on a monitor, a speaker may transmit warning beeps/chirps or a message may be transmitted by the speakers, such as "the mounted device is within 3 feet of the bottom."

Thus, the motor assembly 760 is suitable for casing the tedious process of adjusting the mounted device 750 by rotating the mounted device 750 to different angles or different modes that the motor assembly 760 supports. The motor assembly 760 may now make these adjustments without having to raise the distal end of the pole 110 (with the motor assembly 760 and mounted device 750) out of the water and manually adjust the mounted device 750.

Figure 8:
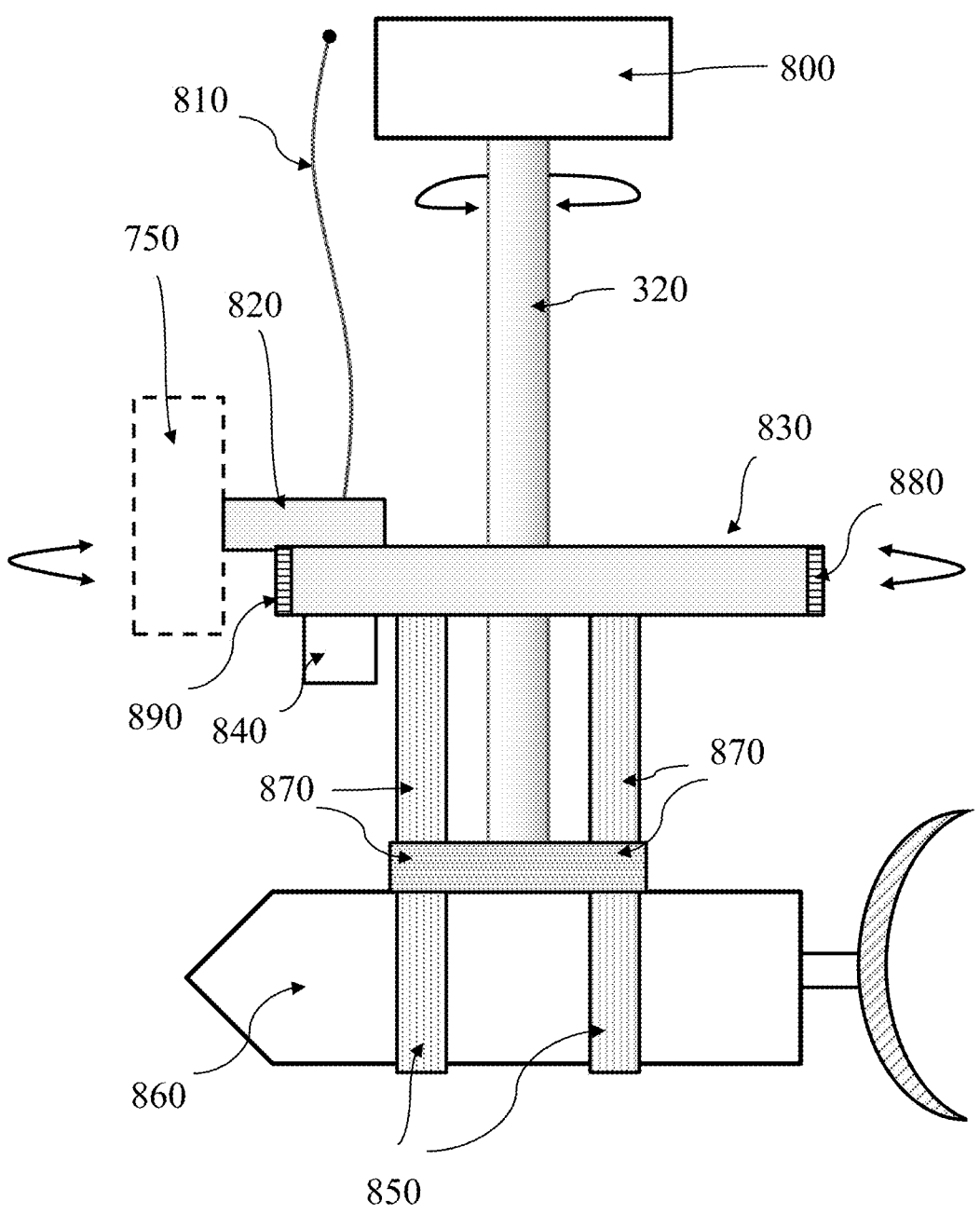
FIG. 8 is an illustration showing a side view of a mechanism for horizontally rotating a mounted device around a troll motor shaft using a mounting ring and a motor.
Figure 9:
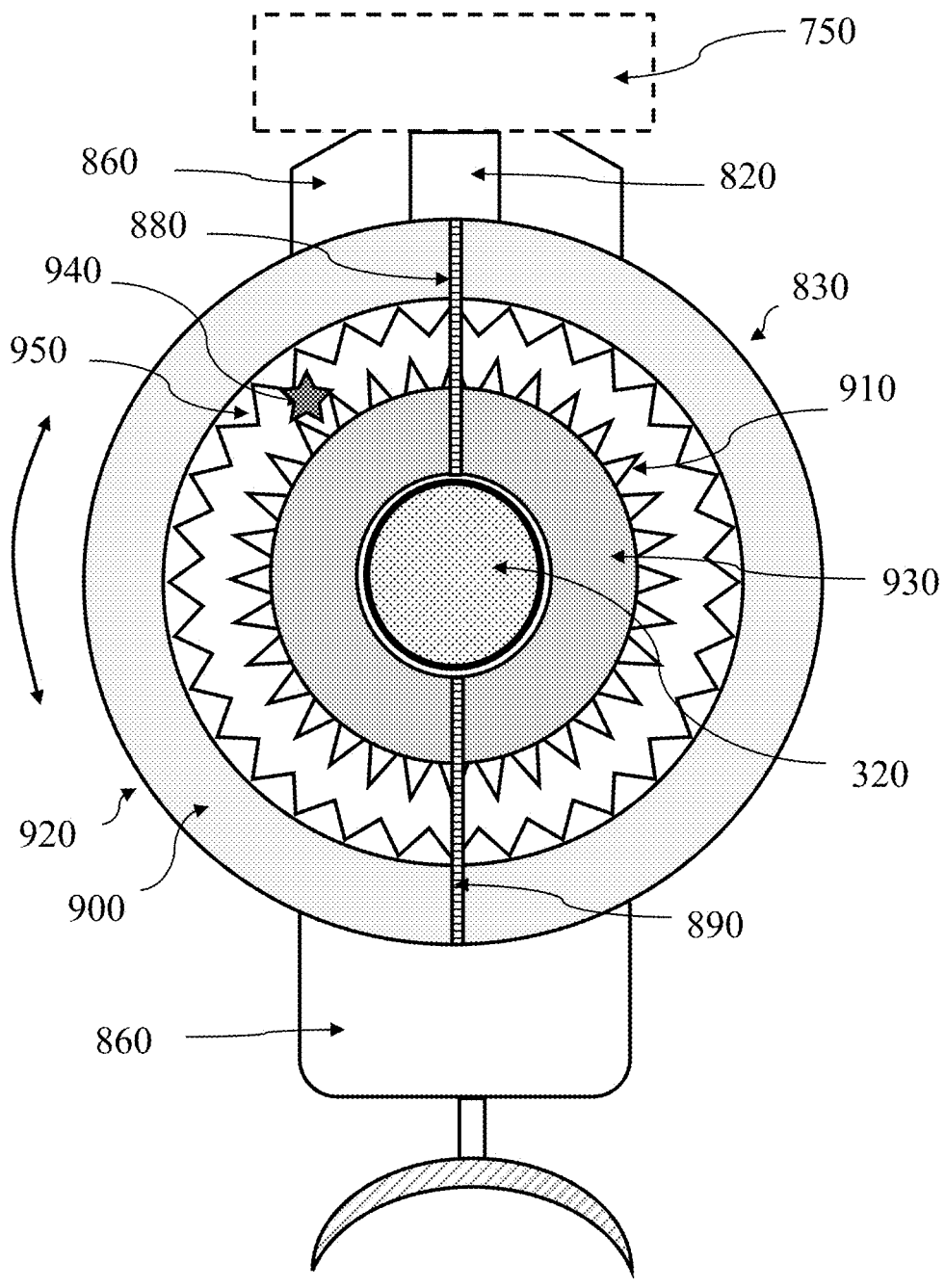
FIG. 9 is an illustration showing a top cross-sectional view of the mechanism for horizontally rotating the mounting device around the troll motor shaft using a mounting ring and motor as shown in FIG. 8 using a gear from a motor engaging with a plurality of inner gears and a plurality of outer gears.

With reference to FIGS. 8 and 9, other embodiments of the invention will now be discussed. These embodiments relate to a mechanism for rotating a mounted device 750 around a pole, such as a troll motor shaft 320, underwater. The mechanisms may be configured to be attached to the pole or the troll motor shaft 320.

As previously described, the mounted device 750 may be used to detect one or more locations of one or more fish and communicate the information to the angler. As non-limiting examples, the mounted device 750 may be a transducer, sonic transducer, optical camera, low light camera, infrared camera, thermal imaging camera or any other item that an angler may be interested in mounting on the mounted device coupler 820 for use while fishing.

While the mechanisms of this embodiment may be mounted on a separate poll, in preferred embodiments the mechanisms are mounted to the troll motor shaft 320 and/or a troll motor head 860. This has the advantage of not needing a separate poll and further allows adjustments in the direction of the troll motor head 860 to also adjust the direction of the mounted device 750. This allows the means of controlling the direction of the troll motor head 860 to also be used to control the direction of the mounted device 750.

To more clearly show the details of these embodiments, FIG. 8 shows a close-up view of a lower portion of the troll motor, while the upper portion of the troll motor 800 (shown in detail in other figures) is merely represented by box representing the troll motor 800 to avoid unnecessarily obscuring the invention in this figure.

FIG. 9 is an illustration showing a top cross-sectional view of the mechanism in this embodiment for horizontally rotating the mounted device 750 around the troll motor shaft 320 using a mounting ring 830 and a stepper motor 840. The mechanism for rotating the mounted device 750 has a mounting ring 830, where the mounting ring comprises an outer mounting ring 920 and an inner mounting ring 930.

The outer mounting ring 920 preferably has an outer surface to prevent water, mud, etc., from entering the mounting ring 830 and interfering with its operation.

In a first embodiment illustrated in FIG. 9, the outer mounting ring 920 may include a gear ring 900 having an inner surface covered with a plurality of outer gear teeth 950 and the inner mounting ring 930 preferably has an outer surface covered with inner gear teeth 910. In a second embodiment illustrated in FIG. 10, the outer mounting ring 920 may include a gear ring 900 also have an inner surface covered with outer gear teeth 950, but the inner mounting ring 930 does NOT have an outer surface covered with inner gear teeth 910. In a third embodiment illustrated in FIG. 11, the outer mounting ring 920 may include a gear ring 900 that does NOT have an inner surface covered with outer gear teeth 950, but the inner mounting ring 930 does have an inner surface covered with a plurality of outer gear teeth 950.

The inner mounting ring 930 may also have a cylindrical inner surface configured to be securely attached to the troll motor shaft 320.

In some embodiments, the mounting ring 830 may not have a first latch 880 and a second latch 890 that would have allowed the mounting ring 830 to open up or split into two halves to more easily surround and be attached to the troll motor shaft 320. In these embodiments, either the troll motor head 860 will have to be removed from the troll motor shaft 320 or the troll motor shaft 320 will have to be detached from the upper portion of the troll motor 800. This would allow the mounting ring 830 to be slid into position on the troll motor shaft 320. Once the mounting ring 830 is on the troll motor shaft 320, either the troll motor head 860 may be reattached to the troll motor shaft 320 or the troll motor shaft 320 may be reattached to the upper portion of the troll motor 800. This embodiment is the most difficult for attachment of the mounting ring 830 to the troll motor shaft 320, but allows for a more securely constructed mounting ring 830.

In other embodiments, the mounting ring 830 may be able to be disassembled into two or more pieces using the first latch 880 and the second latch 890. In this embodiment, the troll motor head 860 or upper portion of the troll motor 800 do not need to be disconnected from the troll motor shaft 320. Instead, the first latch 880 and the second latch 890 may be used to disassemble the mounting ring 830 into two or more pieces so that the mounting ring 830 may be positioned around the troll motor shaft 320 and then reassembled, thereby securely attaching the mounting ring 830 to the troll motor shaft 320.

In still other embodiments, the mounting ring 830 may be configured to have a clam-shell type opening. The first latch 880 may be a hinge and the second latch 890 may be used to allow the mounting ring 830 to open like a clam-shell. The mounting ring 830 may be positioned next to the troll motor shaft 320 and then closed around the troll motor shaft 320 with the second latch 890 reclosing thereby securely attaching the mounting ring 830 to the troll motor shaft 320.

A mounted device coupler 820 may be attached to the outer mounting ring 920 so that as the outer mounting ring 920 rotates, the mounted device coupler 820 also rotates. The mounted device coupler 820 may be specific for a particular mounted device 750 or, preferably, generic so that the mounted device coupler 820 is able to securely connect to a plurality of different types of desired mounted devices 750.

The mounted device coupler 820 may be fixed, i.e., no additional axis of rotation, or in other embodiments, the mounted device coupler 820 may have additional motors and pivot points (such as those previously described) that allow for one or more additional axes of rotation. As a specific example, the mounted device coupler 820 may be the motor assembly 760 previously described and illustrated in FIG. 7. Thus, in these embodiments, the mounted device coupler 820 may be able to pivot, turn and/or rotate the mounted device 750 in one or more additional axes. Specifically, the mounted device coupler may be able to receive inputs (in the same or different manner to the stepper motor 840 receiving inputs) and based on the received inputs pivot the mounted device 705 up and down and/or turn the mounted device 705 to the right or left as previously described with regard to FIG. 7.

Mounting hardware 850 may be attached around the troll motor head 860. The mounting hardware 850 may be used to provide additional support for the mounting ring 830 attached around the troll motor shaft 320.

One or more support brackets 870 may be attached to the mounting ring and the mounting hardware 850. The one or more support brackets 870 may securely connect the mounting hardware 850 around the troll motor head 860 with the mounting ring 830.

A stepper motor 840 may be operably connected by any desired means to the mounting ring 830. The stepper motor may be any desired type of motor. In a preferred embodiment, the stepper motor 840 is an electric stepper motor.

In a first non-limiting example illustrated in FIG. 9, the stepper motor 840 may have a rotatable shaft and a spur gear pinion 940 as part of a kinematic chain that engages and meshes with the outer gear teeth 950 of the gear ring 900 and the inner gear teeth 910 of the inner mounting ring 930 to rotate the outer mounting ring 920 about the inner mounting ring 930. The inner mounting ring 930 may be attached to the troll motor shaft 320.

Figure 10:
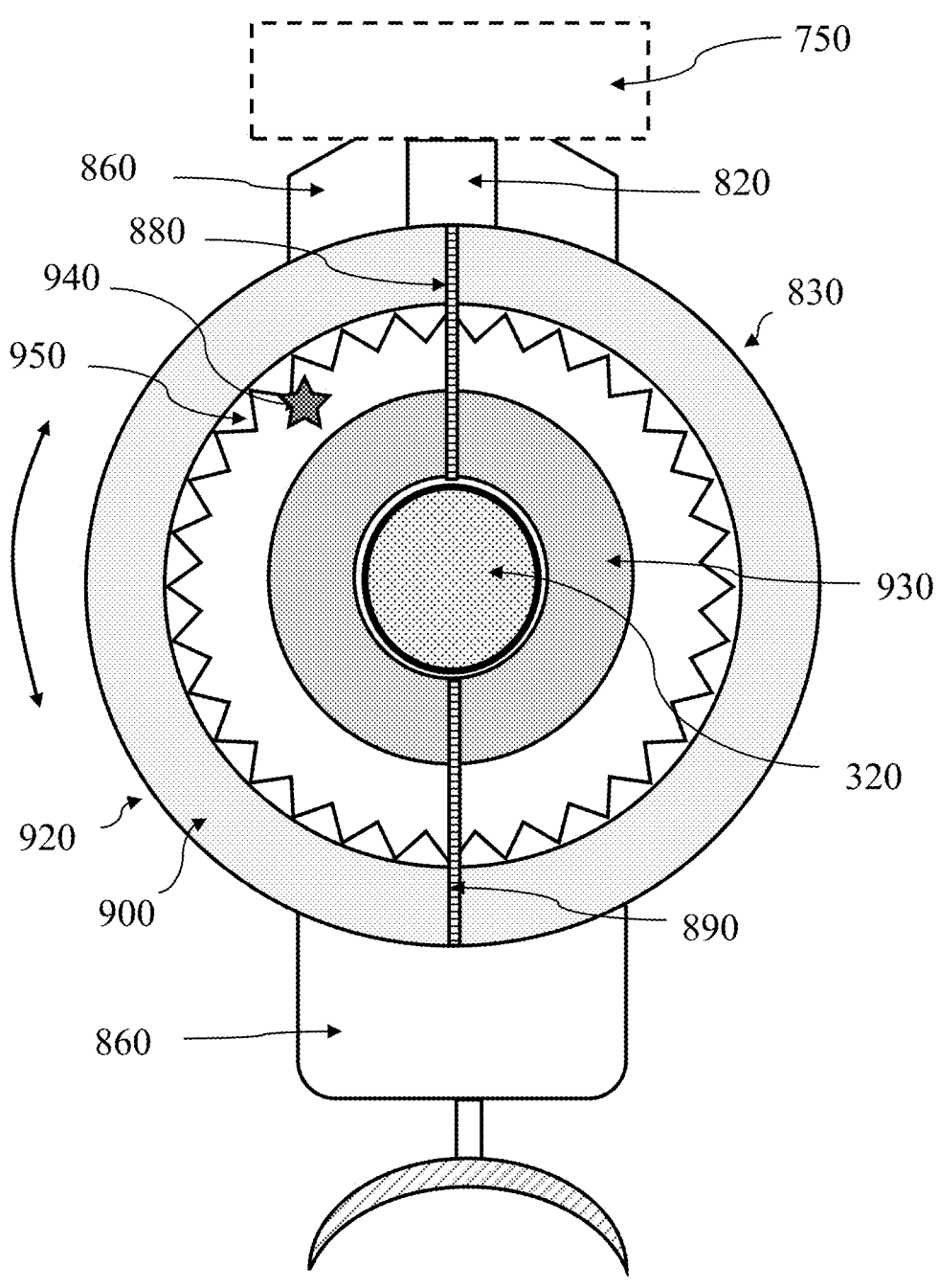
FIG. 10 is an illustration showing a top cross-sectional view of the mechanism for horizontally rotating the mounting device around the troll motor shaft using a mounting ring and motor as shown in FIG. 8 using a gear from a motor engaging with a plurality of outer gears on an outer ring.

In a second non-limiting example illustrated in FIG. 10, the stepper motor 840 may have a rotatable shaft and a spur gear pinion 940 as part of a kinematic chain that engages with the outer gear teeth 950 of the gear ring 900, but does NOT engage or mesh with the inner gear teeth 910 of the inner mounting ring 930, to rotate the outer mounting ring 920 about the inner mounting ring 930. The inner mounting ring 930 may be attached to the troll motor shaft 320.

Figure 11:
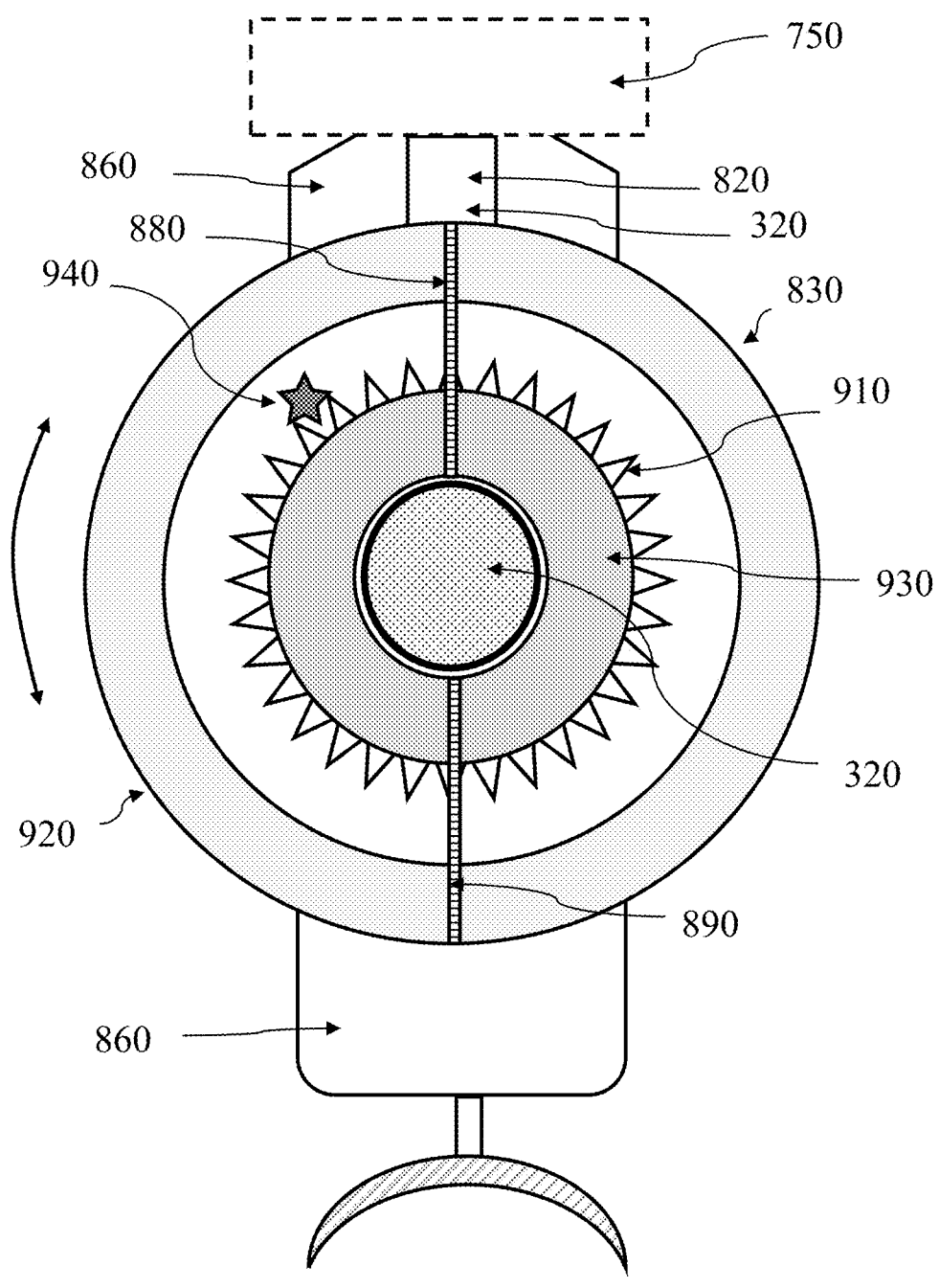
FIG. 11 is an illustration showing a top cross-sectional view of the mechanism for horizontally rotating the mounting device around the troll motor shaft using a mounting ring and motor shown in FIG. 8 using a gear from a motor engaging with a plurality of inner gears on an inner ring.

In a third non-limiting example illustrated in FIG. 11, the stepper motor 840 may have a rotatable shaft and a spur gear pinion 940 as part of a kinematic chain that does NOT engage or mesh with outer gear teeth 950 of the outer mounting ring 920, but does engage with the inner gear teeth 910 of the inner mounting ring 930 to rotate the outer mounting ring 920 about the inner mounting ring 930. The inner mounting ring 930 may be attached to the troll motor shaft 320.

Figure 12:
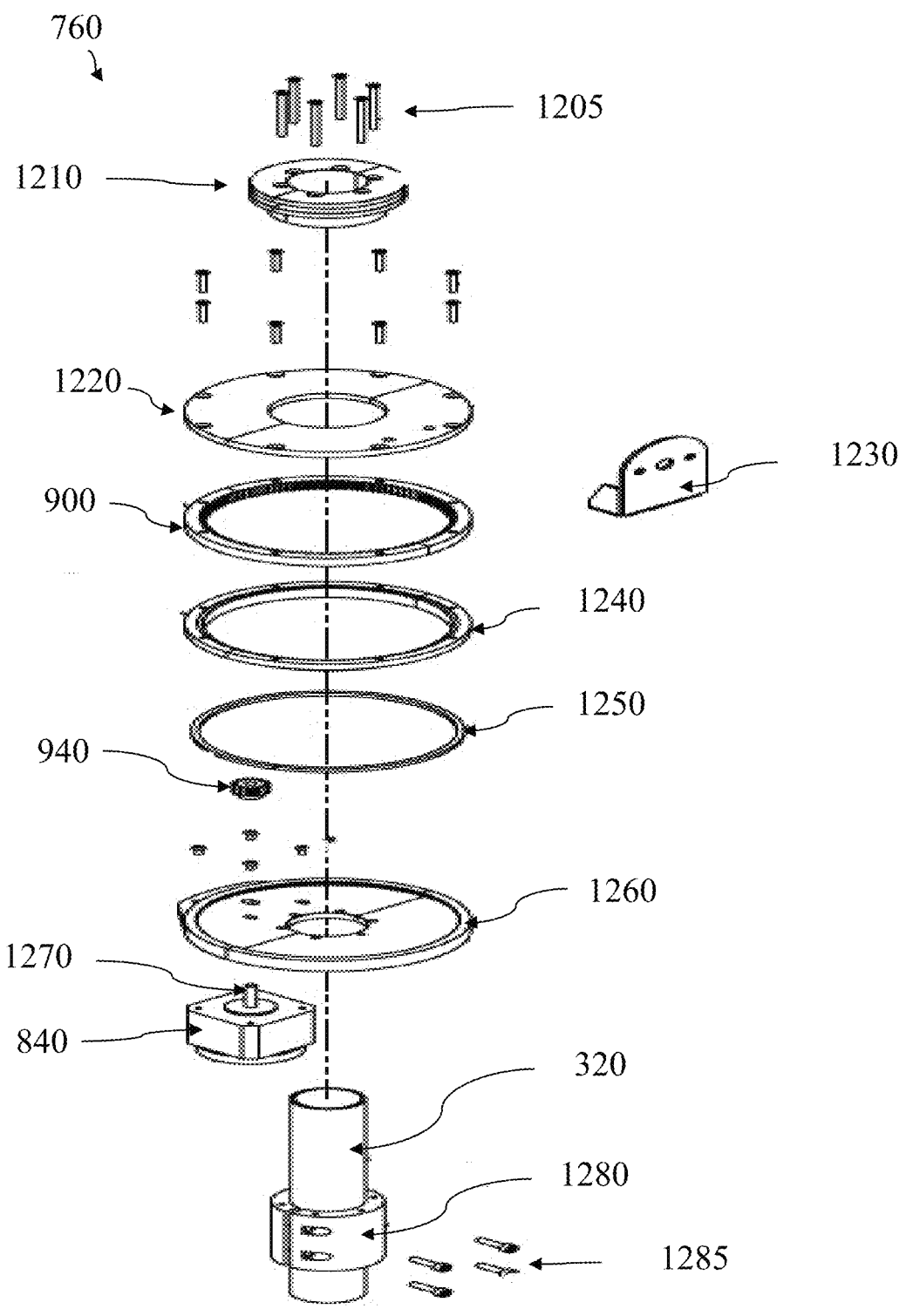
FIG. 12 is an illustration of an exploded view of another possible embodiment of a motor assembly for horizontally rotating the mounted device around the troll motor shaft.

FIGS. 12-26 illustrate various views of another example embodiment of a motor assembly 760 along with various parts and combination of parts that may be used to make the illustrated example of the motor assembly 760 shown in FIG. 12. While the troll motor shaft 320 appears in some of the FIGS. 12-26, the troll motor shaft 320 is not part of the motor assembly 760.

FIG. 12 is an illustration of an exploded view of another possible embodiment of the motor assembly 760. The motor assembly 760 in FIG. 12, as in some other embodiments, may be used to horizontally rotate the mounted device 750 (not shown in FIG. 12) around an axis defined by the troll motor shaft 320. The motor assembly 760 is preferably attached to the troll motor shaft 320 during use. This allows the motor assembly 760 and any mounted device 750 to move in the same direction about the axis of the troll motor shaft 320 when the troll motor shaft 320 is independently moved by the user.

Figure 20:
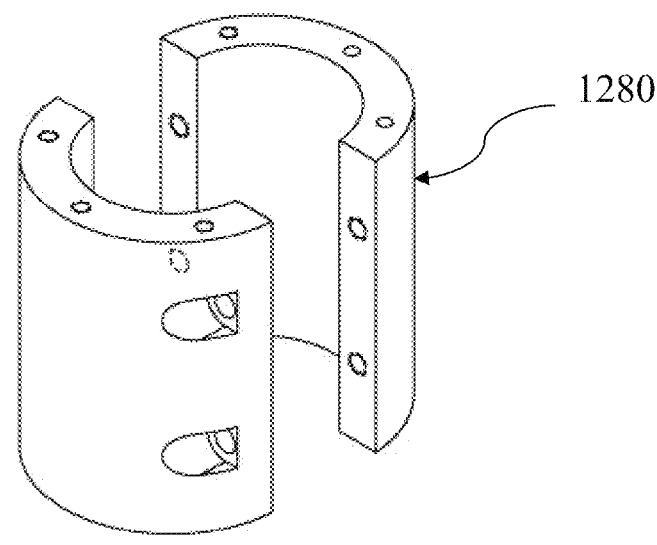
FIG. 20 is an illustration of a perspective view of a possible embodiment of a mounting hub.

FIG. 20 is an illustration of a perspective view of a possible embodiment of a mounting hub 1280. The mounting hub 1280 may be used to attach itself, and therefor the rest of the motor assembly 760 and mounted device 750, to the troll motor shaft 320. The mounting hub 1280 may comprise two symmetrical halves. The two halves of the mounting hub 1280 may be pulled together and tightened around the troll motor shaft 320 by using a plurality of, and preferably four, hex screws 1285. The hex screws 1285 may be screwed into the two halves of the mounting hub 1280 to tighten the mounting hub 1280 around the troll motor shaft 320, thereby connecting the motor assembly 760 to the troll motor shaft 320 via friction. The hex screws 1285 may also be loosened to release the two halves of the mounting hub 1280 from the troll motor shaft 320, thereby releasing the motor assembly 760 from the troll motor shaft 320.

Figure 26:
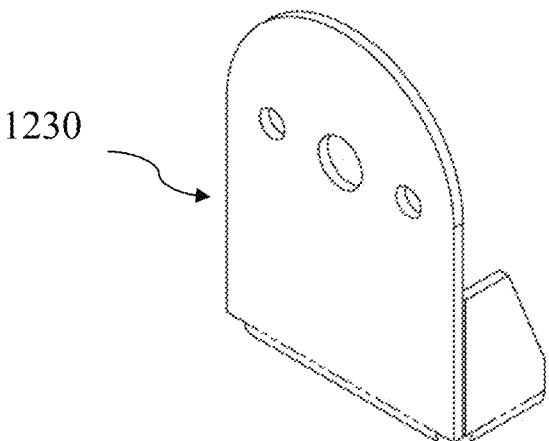
FIG. 26 is an illustration of a perspective view of a possible embodiment of a metal bracket that may be used to connect a mounted device to the motor assembly.

The mounted device 750, which may be of any type previously recited, may be attached to the motor assembly 760 by a metal bracket 1230. FIG. 26 is an illustration of a perspective view of a possible embodiment of a metal bracket 1230 that may be used to connect the mounted device 750 to the motor assembly 760.

Figure 13:
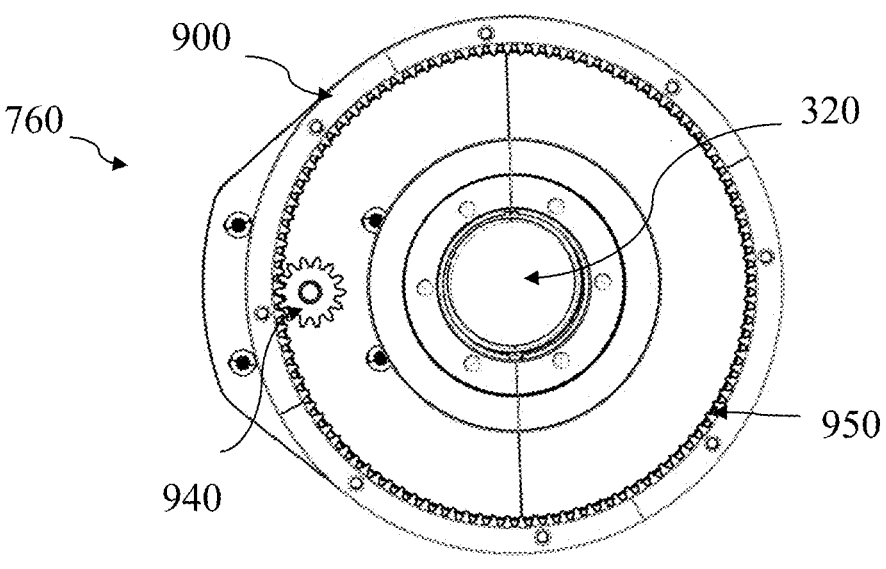
FIG. 13 is an illustration of a top down cross-section view illustrating a spur gear pinion engaging and meshing with the teeth of a gear ring.
Figure 14:
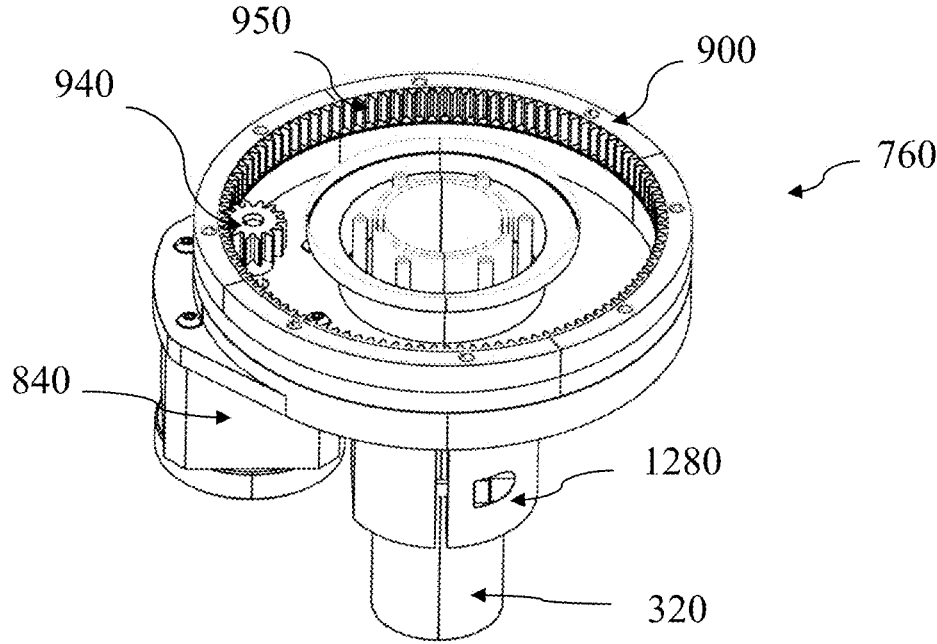
FIG. 14 is an illustration of a perspective cross-section view illustrating the spur gear pinion engaging and meshing with the teeth of the gear ring illustrated in FIG. 13.
Figure 17:
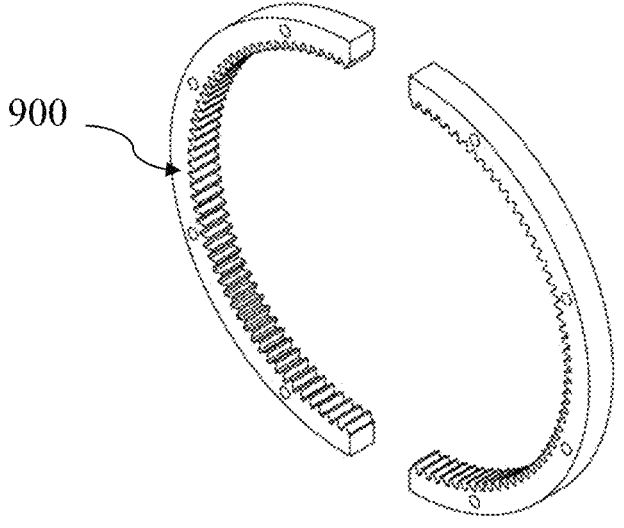
FIG. 17 is an illustration of a perspective view of a possible embodiment of a gear ring.
Figure 19:
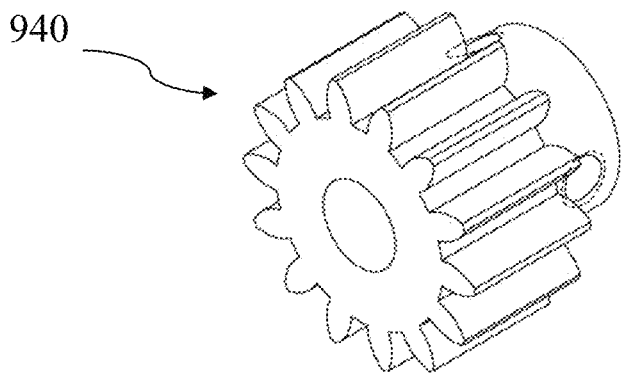
FIG. 19 is an illustration of a perspective view of a possible embodiment of a spur gear pinion.

FIG. 13 is an illustration of a top down cross-section view illustrating a spur gear pinion 940 engaging with the outer gear teeth 950 of a gear ring 900. FIG. 17 is an illustration of a perspective view of a possible embodiment of the gear ring 900. FIG. 14 is an illustration of a perspective cross-section view illustrating the spur gear pinion 940 engaging with the outer gear teeth 950 of the gear ring 900. FIG. 19 is an illustration of a perspective view of a possible embodiment of the spur gear pinion 940. The spur gear pinion 940, gear ring 900 and outer gear teeth 950 of the gear ring 900 may be made of any durable material, but are preferably made of metal.

Figure 15:
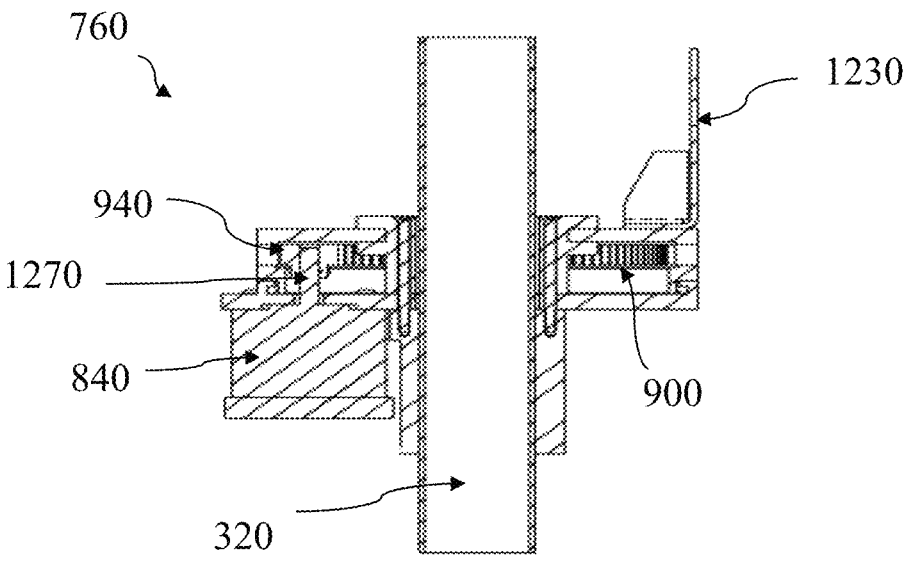
FIG. 15 is an elevation cross-section view illustrating a stepper motor connected to the spur gear pinion via a stepper motor shaft, where the spur gear pinion is engaged or meshed with the teeth of the gear ring.
Figure 16:
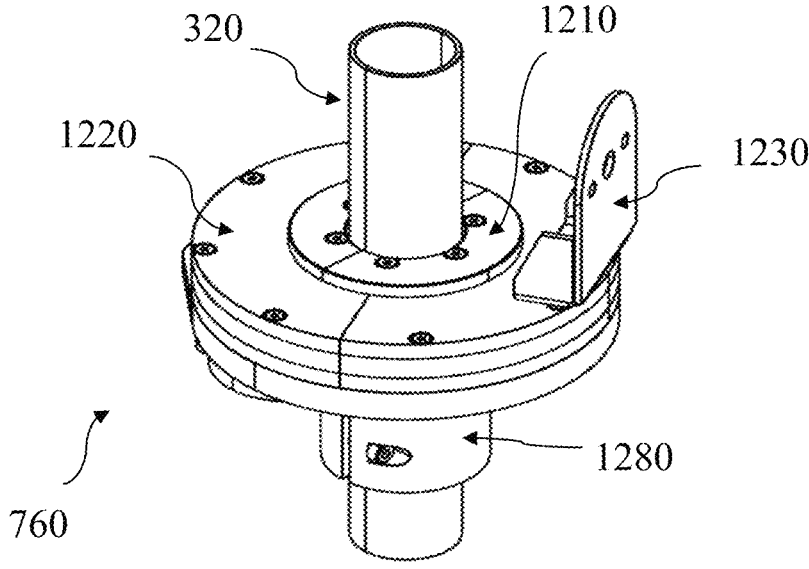
FIG. 16 is an illustration of a perspective view of a possible embodiment of the motor assembly connected to the troll motor shaft.

FIG. 15 is an elevation cross-section view illustrating a stepper motor 840 connected to the spur gear pinion 940 via a stepper motor shaft 1270, where the spur gear pinion 940 is engaged with the outer gear teeth 950 of the gear ring 900. FIG. 16 is an illustration of a perspective view of a possible embodiment of the motor assembly 760 connected to the troll motor shaft 320. In this embodiment, the stepper motor 840 may have a rotatable shaft (stepper motor shaft 1270) and a spur gear pinion 940 as part of a kinematic chain that engages with the outer gear teeth 950 of the gear ring 900, but the spur gear pinion 940 does NOT engage with any inner gear teeth 910 (which preferably do not exist in this embodiment), to rotate the motor assembly 760 and all its parts (along with the attached mounting device 750) about the troll motor shaft 320.

Figure 21:
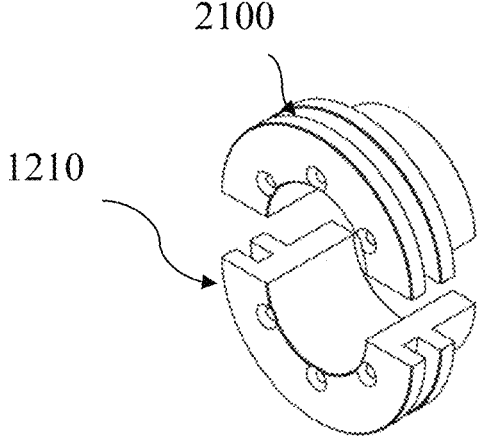
FIG. 21 is an illustration of a perspective view of a possible embodiment of a hub fix part.
Figure 22:
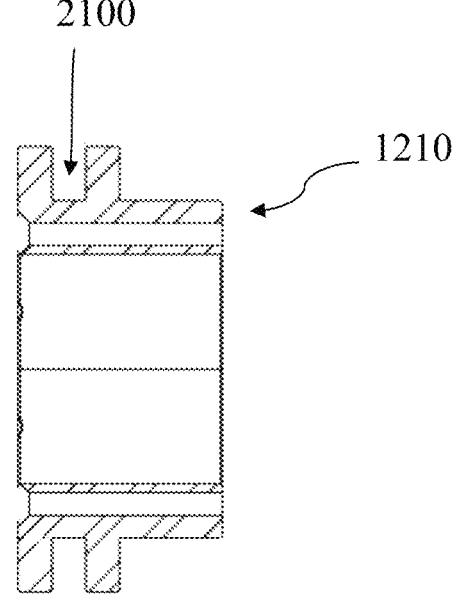
FIG. 22 is an illustration of a cross section view of a possible embodiment of a hub fix part.

FIG. 21 is an illustration of a perspective view of a possible embodiment of a hub fix part 1210. FIG. 22 is an illustration of a cross section view of the possible embodiment of the hub fix part 1210. The hub fix part 1210 may have a hub fix part groove 2100 along an outer edge as shown in FIGS. 21 and 22. The hub fix part 1210 may be made of any desired material, but is preferably made of a strong material that is preferably resistant to rusting. As nonlimiting examples, the hub fix part 1210 may be made of hard plastic, resin, composite, aluminum or steel/stainless steel.

Figure 18:
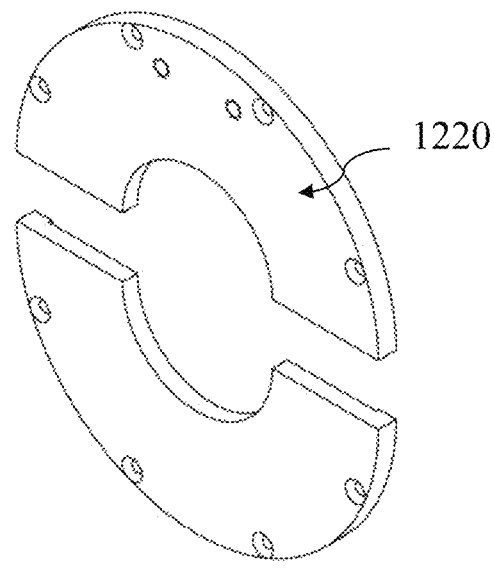
FIG. 18 is an illustration of a perspective view of a possible embodiment of a top ring.

The motor assembly 760 may also include a top ring 1220. FIG. 18 is an illustration of a perspective view of a possible embodiment of the top ring 1220. The hub fix part groove 2100 of the hub fix part 1210 may be sized so that the hub fix part groove 2100 may receive and retain the inner diameter of the top ring 1220 in the hub fix part groove 2100. The top ring 1220 may be made of any desired material, but is preferably made of a strong material that is preferably resistant to rusting. As nonlimiting examples, the top ring 1220 may be made of hard plastic, resin, composite, aluminum or steel/stainless steel.

Figure 23:
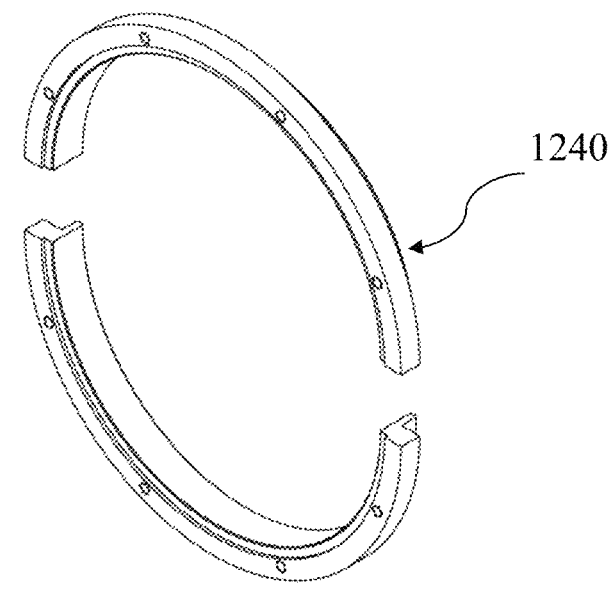
FIG. 23 is an illustration of a perspective view of a possible embodiment of a bottom ring.

FIG. 23 is an illustration of a perspective view of a possible embodiment of a bottom ring 1240. The bottom ring 1240 comprises two halves that, when placed next to each other, form a ring having an inner and outer diameter. The bottom ring 1240 may be made of any desired material, but is preferably made of a strong material that is preferably resistant to rusting. As nonlimiting examples, the bottom ring 1240 may be made of a hard plastic, resin, composite, aluminum or stainless steel.

Figure 25:
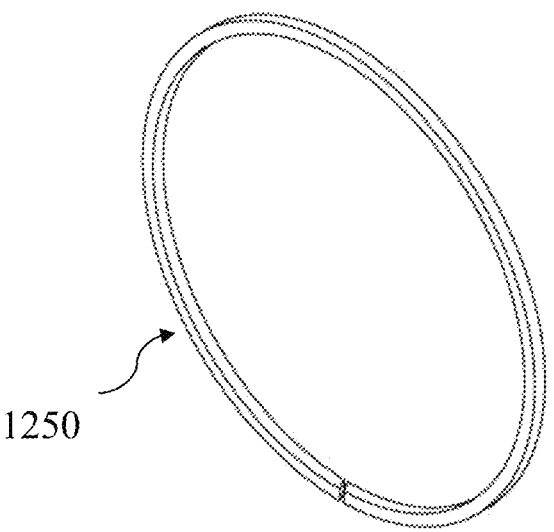
FIG. 25 is an illustration of a perspective view of a possible embodiment of a nylon ring.

FIG. 25 is an illustration of a perspective view of a possible embodiment of a nylon ring 1250. The nylon ring 1250 comprises two halves that, when placed next to each other, form a ring having an inner and outer diameter. The nylon ring 1250 may be made of any material, but is preferably made of nylon.

Figure 24:
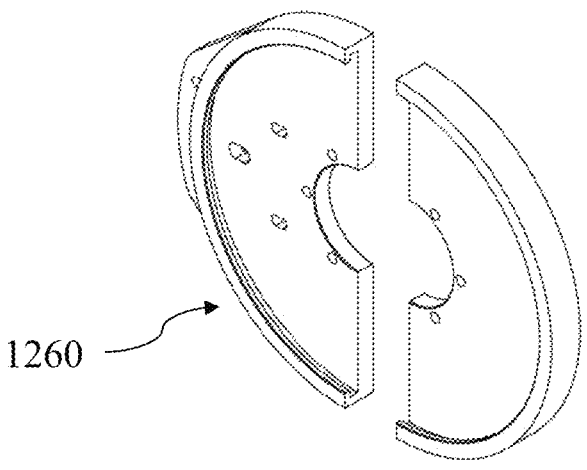
FIG. 24 is an illustration of a perspective view of a possible embodiment of a motor mounting plate.

FIG. 24 is an illustration of a perspective view of a possible embodiment of a motor mounting plate 1260. The motor mounting plate 1260 comprises two halves that, when placed next to each other, form a ring having an inner and outer diameter.

A plurality, and preferably six, head screws 1205 may be used to sandwich and hold together the hub fix part 1210, the top ring 1220, the gear ring 900, the bottom ring 1240, the nylon ring 1250 and the motor mounting plate 1260, preferably in that order from top to bottom. The heads of the head screws 1205 may be retained by the hub fix part 1210 and screwed or bolted to the motor mounting plate 1260, thereby securely retaining the top ring 1220, the gear ring 900, the bottom ring 1240, the nylon ring 1250 between the hub fix part 1210 and the motor mounting plate 1260. In a preferred embodiment, the outer diameters of the top ring 1220, the gear ring 900, the bottom ring 1240, the nylon ring 1250 and the motor mounting plate 1260 are all substantially the same, i.e., within a quarter inch of each other. While the outer diameter may be any length, in a preferred embodiment, the outer diameter of the top ring 1220, the gear ring 900, the bottom ring 1240, the nylon ring 1250 and the motor mounting plate are all between 6 inches and 24 inches in diameter and most preferably about 12 inches in diameter. The top ring 1220, the gear ring 900, the bottom ring 1240, the nylon ring 1250 and the motor mounting plate 1260 may be described as a ring, O-ring shaped, doughnut shaped, cylinders or cylindrical (with a short length in comparison to the diameter).

The top ring 1220, the gear ring 900, the bottom ring 2140, the nylon ring 1250 and the motor mounting plate 1260, when compressed together using the head screws 1205, form an inner chamber in the motor assembly 760 that houses and allows the spur gear pinion 940 to rotate as part of a kinematic chain that engages with the outer gear teeth 950 of the gear ring 900 to thereby rotate the motor assembly 760 about an axis of the troll motor shaft 320.

The stepper motor 840 may then be used to allow the mounted device 750 attached to the outer mounting ring 920, via the mounted device coupler 820, to be rotated in either a clockwise direction at a first time or a counter-clockwise direction at a second time around a vertical axis of the troll motor shaft 320.

The stepper motor 840 may receive power from one or more batteries on the boat via a motor wire 810 or the stepper motor 840 may receive power from batteries positioned underwater near the stepper motor 840. The mounted device 750 attached to the outer mounting ring 920, via the mounted device coupler 820, may be rotated by controlling the direction and speed of the stepper motor 840 using any desired means. As non-limiting examples, the direction (clockwise or counter-clockwise) the mounted device 750 is horizontally rotated about the vertical axis of the troll motor shaft 320 may be controlled by hand switches, foot pucks 170 (which are configured to be controlled by a user's feet or hands) that send signals (either wirelessly, such as by using a Bluetooth connection, or by being wired) and/or by voice commands. In a preferred embodiment, the foot pucks 170 may be used. As a specific example of their use, a first foot puck of the foot pucks 170 may rotate the mounted device 750 in a clockwise direction while a second foot puck of the foot pucks 170 may rotate the mounted device 750 in a counter-clockwise direction. In some embodiments, multiple presses of the same foot puck may increase the speed of rotation.

As non-limiting examples, the movement of the mounted device 750 may be controlled by either one or two feet pressing on specially configured foot pucks 170. In addition, or alternatively, the movement of the mounted device 750 may be voice controlled.

The information from the mounted device 750 may be communicated to the angler by any desired means. As non-limiting examples, the information may be communicated to the angler either on a screen on the boat or through one or more speakers.

A control box may display an arrow or other icon indicating the direction and/or the speed of movement of the mounted device 750. The control box may be separate from the main control unit, be a part of the main control unit, be wirelessly connected to the main control unit or be wired to the main control unit. The control box in some embodiments may have a digital display.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims.

Thus, the description is to be regarded as illustrative instead of restrictive of the present invention.

What is claimed is:

1. A motor assembly for rotating a mounted device around a troll motor shaft underwater, comprising:

a top ring having an O-ring shape and split into two separate halves;

a gear ring having an inner surface covered with a plurality of gear teeth and split into two separate halves;

a bottom ring having a ring shape and split into two separate halves;

a motor mounting plate having an O-ring shape and split into two separate halves;

a stepper motor attached to the motor mounting plate;

a stepper motor shaft rotated by the stepper motor; and a spur gear pinion attached to the stepper motor shaft, wherein the top ring, the gear ring, the bottom ring and the motor mounting plate are configured, when positioned on top of each other, to form an inner chamber in the motor assembly that allows the stepper motor to rotate the spur gear pinion inside the inner chamber, the spur gear pinion engages with the plurality of gear teeth of the gear ring to thereby rotate the motor assembly about an axis of the troll motor shaft.

2. The motor assembly of claim 1, further comprising:

a hub fix part, having an O-ring shape and split into two separate halves, positioned on top of the top ring and configured to securely hold the top ring, the gear ring, the bottom ring and the motor mounting plate together to create the inner chamber.

3. The motor assembly of claim 2, further comprising:

a mounting hub, shaped as two separate halves of a hollow cylinder, is configured to attach the motor assembly to the troll motor shaft.

4. The motor assembly of claim 1, further comprising:

a metal bracket configured to attach the mounted device to the motor assembly.

5. The motor assembly of claim 1, further comprising a pair of wireless foot operated pucks configured to control a direction of rotation of the mounted device.

6. The motor assembly of claim 1, further comprising a pair of wired foot operated pucks configured to control a direction of rotation of the mounted device.

7. The motor assembly of claim 1, further comprising a control box that provides digital display indicator that is wired to mechanism.

8. The motor assembly of claim 1, wherein a wireless or wired indicator display is connected to control box.

9. A motor assembly for rotating a mounted device around a troll motor shaft underwater, comprising:

a hub fix part having an O-ring shape and split into two separate halves;

a top ring having an O-ring shape and split into two separate halves configured to be placed below the hub fix part;

a gear ring having an inner surface covered with a plurality of gear teeth and split into two separate halves configured to be placed below the top ring;

a bottom ring having a ring shape and split into two separate halves configured to be placed below the gear ring;

a motor mounting plate having an O-ring shape and split into two separate halves configured to be placed below the bottom ring;

a stepper motor attached to the motor mounting plate;

a stepper motor shaft rotated by the stepper motor; and a spur gear pinion attached to the stepper motor shaft, wherein the hub fix part, the top ring, the gear ring, the bottom ring and the motor mounting plate are configured, when positioned on top of each other, to form an inner chamber in the motor assembly that allows the stepper motor to rotate the spur gear pinion inside the inner chamber, the spur gear pinion engages with the plurality of gear teeth of the gear ring to thereby rotate the motor assembly about an axis of the troll motor shaft.

10. The motor assembly of claim 9, further comprising:

a mounting hub, shaped as two separate halves of a hollow cylinder, is configured to attach the motor assembly to the troll motor shaft.

11. The motor assembly of claim 9, further comprising:

a metal bracket configured to attach the mounted device to the motor assembly.

12. The motor assembly of claim 9, further comprising a pair of wireless foot operated pucks configured to control a direction of rotation of the mounted device.

13. The motor assembly of claim 9, further comprising a pair of wired foot operated pucks configured to control a direction of rotation of the mounted device.

14. The motor assembly of claim 9, further comprising a control box that provides digital display indicator that is wired to mechanism.

15. The motor assembly of claim 9, wherein a wireless or wired indicator display is connected to control box.

16. A mechanism for rotating a mounted device around a troll motor shaft underwater, comprising:

a mounting ring, comprising:

an outer mounting ring having an outer surface and an inner surface covered with a plurality of outer gears, and an inner mounting ring having an outer surface and a cylindrical inner surface configured to be securely attached to a troll motor shaft;

a mounted device coupler attached to the outer mounting ring and configured to securely attach to a mounted device;

a plurality of support brackets configured to securely attach the mounting ring with a plurality of mounting hardware; and a motor operably connected to the mounting ring having a shaft and a gear configured to mesh with the plurality of outer gears and configured to horizontally rotate the mounted device attached to the outer mounting ring clockwise at a first time and counter-clockwise at a second different time about the troll motor shaft.

17. The mechanism of claim 16, further comprising a pair of wireless foot operated pucks configured to control a direction of rotation of the mounted device.

18. The mechanism of claim 16, further comprising a pair of wired foot operated pucks configured to control a direction of rotation of the mounted device.

19. The mechanism of claim 16, further comprising a control box that provides digital display indicator that is wired to the mechanism.

* * * * *